US010860187B1

(12) United States Patent
MacInnis et al.

(10) Patent No.: US 10,860,187 B1
(45) Date of Patent: Dec. 8, 2020

(54) OBJECT ORIENTED INTERACTIONS

(71) Applicant: Inkling Systems, Inc., San Francisco, CA (US)

(72) Inventors: Charles M MacInnis, San Francisco, CA (US); Robert Cromwell, San Francisco, CA (US); Joshua John Forman, San Francisco, CA (US); Kenneth Lorenz Knowles, San Francisco, CA (US); Peter S Cho, San Francisco, CA (US); Chatree Campiranon, Foster City, CA (US); Aaron Haney, San Francisco, CA (US); Kevin Ballard, San Francisco, CA (US); Scott William Kyle, El Dorado Hills, CA (US); Anne K Halsall, San Francisco, CA (US); Jonathan Wight, Emeryville, CA (US)

(73) Assignee: Inkling Systems, Inc., San Francisco, CA (US)

( * ) Notice: Subject to any disclaimer, the term of this patent is extended or adjusted under 35 U.S.C. 154(b) by 0 days.

(21) Appl. No.: 16/033,475

(22) Filed: Jul. 12, 2018

Related U.S. Application Data

(63) Continuation of application No. 14/327,550, filed on Jul. 9, 2014, now Pat. No. 10,042,530, which is a
(Continued)

(51) Int. Cl.
*G06F 3/048* (2013.01)
*G06F 3/0484* (2013.01)
(Continued)

(52) U.S. Cl.
CPC .......... *G06F 3/04845* (2013.01); *G06F 3/048* (2013.01); *G06F 3/0483* (2013.01); *G06F 16/9535* (2019.01)

(58) Field of Classification Search
CPC .. G06F 3/048; G06F 3/04845; G06F 16/9535; G06F 3/0483
See application file for complete search history.

(56) References Cited

U.S. PATENT DOCUMENTS 7,724,696 B1 5/2010 Parekh
7,747,943 B2 6/2010 Bargeron et al.
(Continued)

OTHER PUBLICATIONS

Brian Barrett, The Copia eBook Platform and Hardware Get Social With eReading, Jan. 6, 2010, gizmodo.com, pp. 1-4.
(Continued)

*Primary Examiner* — Xuyang Xia
(74) *Attorney, Agent, or Firm* — Ascenda Law Group, PC

(57) ABSTRACT

A system and method of social interaction includes receiving interaction information for an interaction created by a first user of an electronic content work, the interaction information comprising an identification number of a portion of the electronic content work associated with the interaction. The system and method includes storing the received interaction information. The system and method also includes receiving a request from a second user requesting interaction information for a requested portion of the electronic content work. The system and method also includes sending the received interaction information in response to determining that the identification number associated with the received interaction information matches the identification in the request for interaction information.

4 Claims, 15 Drawing Sheets

Related U.S. Application Data continuation of application No. 13/213,994, filed on Aug. 19, 2011, now Pat. No. 8,799,493, which is a continuation-in-part of application No. 12/731,656, filed on Mar. 25, 2010, now Pat. No. 8,799,765, and a continuation-in-part of application No. 13/019,211, filed on Feb. 1, 2011, now Pat. No. 8,632,985.

(60) Provisional application No. 61/300,319, filed on Feb. 1, 2010.

(51) Int. Cl.
  *G06F 3/0483* (2013.01)
  *G06F 16/9535* (2019.01)

(56) References Cited

U.S. PATENT DOCUMENTS

| | | | |
|---|---|---|---|
| 7,809,582 | B2 | 10/2010 | Wessling et al. |
| 7,818,679 | B2 | 10/2010 | Clarke |
| 7,870,274 | B1 | 1/2011 | Contino et al. |
| 8,370,341 | B1 | 2/2013 | Cromwell et al. |
| 2003/0065642 | A1 | 4/2003 | Zee |
| 2005/0091027 | A1 | 4/2005 | Zaher et al. |
| 2005/0132281 | A1 | 6/2005 | Pan et al. |
| 2005/0160356 | A1 | 7/2005 | Albornoz et al. |
| 2007/0118794 | A1 | 5/2007 | Hollander et al. |
| 2008/0098295 | A1 | 4/2008 | Nelson et al. |
| 2008/0162554 | A1* | 7/2008 | Martino ............... G06F 16/337 |
| 2008/0168073 | A1 | 7/2008 | Siegel et al. |
| 2008/0243828 | A1 | 10/2008 | Reztlaff et al. |
| 2008/0259057 | A1 | 10/2008 | Brons |
| 2008/0274687 | A1* | 11/2008 | Roberts ............... G06Q 30/02 455/3.06 |
| 2009/0019061 | A1 | 1/2009 | Scannell, Jr. |
| 2009/0058822 | A1 | 3/2009 | Chaudhri |
| 2009/0094538 | A1 | 4/2009 | Ringler |
| 2009/0125413 | A1 | 5/2009 | Le Chevalier et al. |
| 2009/0220216 | A1 | 9/2009 | Marsh et al. |
| 2009/0300475 | A1 | 12/2009 | Fink et al. |
| 2010/0003659 | A1 | 1/2010 | Edmonds |
| 2010/0146118 | A1 | 6/2010 | Wie |
| 2010/0156913 | A1 | 6/2010 | Ortega et al. |
| 2010/0161499 | A1 | 6/2010 | Holcombe et al. |
| 2010/0180009 | A1 | 7/2010 | Callahan |
| 2010/0191799 | A1* | 7/2010 | Fiedorowicz ......... G06F 16/954 709/203 |
| 2010/0257239 | A1 | 10/2010 | Roberts |
| 2010/0262911 | A1 | 10/2010 | Kaplan et al. |
| 2010/0278453 | A1 | 11/2010 | King |
| 2010/0299616 | A1 | 11/2010 | Chen et al. |
| 2011/0107369 | A1 | 5/2011 | O'Brien et al. |
| 2011/0167350 | A1 | 7/2011 | Hoellwarth |
| 2011/0179385 | A1* | 7/2011 | Li ...................... G06F 16/7867 715/810 |
| 2012/0050012 | A1 | 3/2012 | Alsina et al. |

OTHER PUBLICATIONS

Frederic Lardinois, "Copia Challenges Amazon, B&N and Sony: Unveils New E-Book Platform and 6 E-Readers," Jan. 6, 2010, readwrite.com, pp. 1-3.

Jane Litte, "Software EBook Highlights from CES 201 0," Jan. 10, 2010, dearauthor.com, pp. 1 - 8.

Wolfram Research, Inc., "About the Wolfram Demonstrations Project", [retrieved on Jan. 4, 2012]. Retrieved from the Internet: <URL:http://demonstrations.wolfram.com/about.html>, pp. 1-3 (Jul. 18, 2011).

Reed College, Web page describing biology software entitled "PopBio", [retrieved on May 24, 2011]. Retrieved from be Internet: <URL: http://academic.reed.edu/biology/software.html>, p. 1 (2008).

Desmos, Inc., "About Us", [retrieved on Aug. 3, 2011]. Retrieved from the Internet: <URL:http://www.desmos.com/about >, p. 1 (publication date unknown).

Desmos, Inc., "Blog", [retrieved on Aug. 3, 2011]. Retrieved from the Internet: <URL:http://blog.desmos.com >, pp. 1-6 (Jul. 2011-Aug. 2011).

Desmos, Inc., "Frequently Asked Questions", [retrieved on Aug. 3, 2011]. Retrieved from the Internet: <URL:www.desmos.com/faqs >, pp. 1-2 (2011).

Once Upon A Time Productions, LLC, "Fall Improvements Part 2", [retrieved on Feb. 24, 2012]. Retrieved from be Internet: <URL:https://tutor-trove.tenderapp.com/kb/version-updates/fall-tweaks-part-2>, pp. 1-9 (Oct. 2010).

Once Upon A Time Productions, LLC, "Fall Tweaks Part 1", [retrieved on Feb. 24, 2012]. Retrieved from the Internet: <URL:https://tutor-trove.tenderapp.com/kb/version-updates/fall-tweaks-part-1-september-14-2010>, pp. 1-11 (Sep. 2010).

Stylishly Bookish, "Kindle Now Sharing Your Highlights", [retrieved on Aug. 18, 2011]. Retrieved from the Internet: <URL:http://stylishlybookish.wordpress.com/2010/05/05/kindle-now-sharing-your-highlights/>, pp. 1-4 (May 5, 2010).

Bonnier AB, "Mag+", [retrieved on Feb. 24, 2012). Retrieved from the Internet: <URL:http://vimeo.com/8217311>, pp. 1-17 (2010). Web page and comments describing video content.

Techcrunch.com, "Math Geeks, Rejoice! The Desmos Graphing Calculator Is Here, It's Online and It's Free", [retrieved on Aug. 3, 2011]. Retrieved from the Internet: <URL:http://techcrunch.com/2011/06/24/desmos-graphing-calculator/>, p. 1 (Jun. 24, 2011). Web page describing video presentation.

Once Upon a Time Productions, LLC, "Online Tutoring", [retrieved on Feb. 24, 2012]. Retrieved from the Internet: <URL:http://www.tutortrove.com/services.php>, p. 1 (2011).

"Orbit3d for Mac", Version: 1.0, online software available at download.cnet.com are related web pages, [retrieved on Aug. 10, 2011]. Retrieved from the Internet: <URL:http://download.cnet.com/Orbit3d/3000-2054_4-10071019.html>, pp. 1-8 (Mar. 24, 2003).

Greene, Araby, "Share Kindle Hightlights on Facebook", blog posting at webbishbooks.com [retrieved on Aug. 18, 2011]. Retrieved from the Internet: <URL:http://webbishbooks.com/201 0/09/share-kindle-highlights-on-facebook>, pp. 1-2 (Sep. 9, 2010).

Once Upon A Time Productions, LLC, "Simplified Scheduling", [retrieved on Feb. 24, 2012]. Retrieved from the Internet: <URL:http://www.tutortrove.com/services.php>, p. 1 (2011).

Once Upon A Time Productions, LLC, "Student Tutorial", [retrieved on Feb. 24, 2012]. Retrieved from the Internet: <URL:https://tutor-trove.tenderapp.com/kb/welcome-to-tutor-trove/student-tutorial>, pp. 1-4 (Mar. 4, 2011).

Wolfram Research, Inc., "Tangent to a Curve", [retrieved on May 24, 2011]. Retrieved from the Internet: <URL:http://demonstrations.wolfram.com/TangentToACurve/>, pp. 1-2 (2009).

Once Upon A Time Productions, LLC, "The Basics for Tutors", [retrieved on Feb. 24, 2012]. Retrieved from the Internet: <URL:https://tutor-trove.tenderapp.com/kb/getting-started/the-basics-for-tutors?sso=>, pp. 1-7 (2011).

Once Upon A Time Productions, LLC, "Tutor Trove Feature Demo", [retrieved on Mar. 7, 2012]. Retrieved from the Internet: <URL:http://www.tutortrove.com/popup video.php?id=3 >, p. 1 (2011).

Once Upon A Time Productions, LLC, "Manage Your Users", [retrieved on Feb. 24, 2012]. Retrieved from the Internet: <URL:http://www.tutortrove.com/services.php >, p. 1 (2011).

Once Upon A Time Productions, LLC, "Tutor Trove Support: About Users", [retrieved on Aug. 3, 2011]. Retrieved from the Internet: <URL:https://tutor-trove.tenderapp.com/kb/users/about-users>, pp. 1-4 (2011).

Once Upon A Time Productions, LLC, "Tutor Trove Support: Equations", [retrieved on Feb. 24, 2012]. Retrieved from the Internet: <URL:https://tutor-trove.tenderapp.com/kb/the-whiteboard/equations >, pp. 1-8 (2011).

Once Upon A Time Productions, LLC, "Tutor Trove Support: Graphing", [retrieved on Aug. 3, 2011]. Retrieved from the Internet: <URL:https://tutor-trove.tenderapp.com/kb/the-whiteboard/graphing >, pp. 1-4 (2011).

(56) References Cited

OTHER PUBLICATIONS

Once Upon A Time Productions, LLC, "Tutor Trove Support: Navigating the Whiteboard", [retrieved on Feb. 24, 2012]. Retrieved from the Internet: <URL:https://tutor-trove.tenderapp.com/kb/the-whiteboard/navigating-the-whiteboard>, pp. 1-7 (2011).

Once Upon A Time Productions, LLC, "Tutor Trove Support: Scheduling Sessions", [retrieved on Aug. 3, 2011]. Retrieved from the Internet <URL:https://tutor-trove.tenderapp.com/kb/sessions/scheduling-sessions >, pp. 1-5 (2011).

Once Upon A Time Productions, LLC, "Tutor Trove Support: Tutoring Services", [retrieved on Aug. 3, 2011]. Retrieved from the Internet: <URL:https://tutor-trove.tenderapp.com/kb/services-locations/tutoring-services>, pp. 1-6 (2011).

Once Upon A Time Productions, LLC, "Tutor Trove Support: Your Menu", [retrieved on Aug. 3, 2011]. Retrieved from the Internet: <URL:https://tutor-trove.tenderapp.com/kb/navigating-your-tutor-trove-site/your-menu>, pp. 1-6 (2011).

Once Upon A Time Productions, LLC, "Tutor Trove: Testimonials", [retrieved on Aug. 3, 2011]. Retrieved from the Internet: <URL:http://www.tutortrove.com/testimonials.php >, pp. 1-2 (2011).

Once Upon A Time Productions, LLC, "Version Update Feb. 21, 2011!", [retrieved on Feb. 24, 2012]. Retrieved from the Internet: <URL:https://tutor-trove.tenderapp.com/kb/version-update-february-21-2011>, pp. 1-9 (Feb. 2011).

Once Upon A Time Productions, LLC, "Whiteboard Video Tutorials—Equations & Graphing", [retrieved on Aug. 3, 2011]. Retrieved from the Internet: <URL:https://tutor-trove.tenderapp.com/kb/welcome-to-tutor-trove/whiteboard-video-tutorials-equations-graphing?sso>, pp. 1-10 (2011).

Once Upon A Time Productions, LLC, "Whiteboard Video Tutorials—Files & Images", [retrieved on Aug. 3, 2011]. Retrieved from the Internet: <URL:https://tutor-trove.tenderapp.com/kb/welcome-to-tutor-trove/whiteboard-video-tutorials-files-images>, pp. 1-6 (2011).

Once Upon A Time Productions, LLC, "Whiteboard Video Tutorials—Manipulating Shapes", [retrieved on Aug. 3, 2011]. Retrieved from the Internet: <URL:https://tutor-trove.tenderapp.com/kb/welcome-to-tutortrove/whiteboard-video-tutorials-manipulating-shapes>, pp. 1-8 (2011).

Boog, J., "How to Copy, Paste & Share Your Kindle Highlights", [retrieved on Aug. 18, 2011]. Retrieved from the Internet: <URL:http://www.mediabistro.com/galleycat/how-to-copy-paste-your-kindle-highlights_b22950>, pp. 1-4 (Aug. 5, 2011).

Freeman, D., "Kindle Notes and Highlights Now Accessible on the Web", [retrieved on Aug. 18, 2011]. Retrieved from the Internet: <URL:http://techcrunch.com/2009/05/26/kindle-notes-and-highlights-now-accessible-on-the-web/>, pp. 1-2 (May 26, 2009).

Golden, A., "Orbit3D", online user guide posted at sourceforge.net [retrieved on Aug. 19, 2011]. Retrieved from the Internet: <URL:http://orbit3d.sourceforge.net/>, pp. 1-15 (2002).

Reid, Calvin, "Book Country Launches Self-Publishing Services", [retrieved on Nov. 18, 2011]. Retrieved from Internet: <URL:http://www.publishersweekly.com/pw/by-topic/industry-news/publisher-news/article/49523-book-country-launches-self-publishing-services.html>, pp. 1-4 (Nov. 16, 2011).

Empson, R., "Build and Share Rich Educational Content With Desmos", [retrieved on Mar. 7, 2012]. Retrieved from the Internet: <URL:http://techcrunch.com/2011/05/24/buildand-share-rich-educational-content-with-desmos/>, (May 24, 2011 ), 1 pg.

\* cited by examiner

OBJECT ORIENTED INTERACTIONS

RELATED APPLICATIONS

This application is a continuation of U.S. patent application Ser. No. 14/327,550, filed Jul. 9, 2014, now U.S. Pat. No. 10,042,530, which is a continuation of U.S. patent application Ser. No. 13/213,994, filed Aug. 19, 2011, now U.S. Pat. No. 8,799,493, which is (a) a continuation in part of U.S. patent application Ser. No. 12/731,656, filed Mar. 25, 2010, now U.S. Pat. No. 8,799,765, which claims the priority benefit of U.S. Provisional Patent Application No. 61/300,319, filed Feb. 1, 2010, which are both hereby incorporated by reference herein in their entirety; and (b) a continuation in part of U.S. patent application Ser. No. 13/019,211, filed Feb. 1, 2011, now U.S. Pat. No. 9,632,985, which is hereby incorporated by reference herein in its entirety, and claims the priority benefit of U.S. Provisional Patent Application No. 61/300,319, filed Feb. 1, 2010.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Inkling Systems, Inc. All Rights Reserved.

BACKGROUND

Traditional media such as textbooks and printed books lack critical features for enhancing learning content. This can make learning or enjoying the content difficult. Additionally, interactions with other content users must be done through telephone, face to face, or other traditional communication methods.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Introduction

Figure 1A:
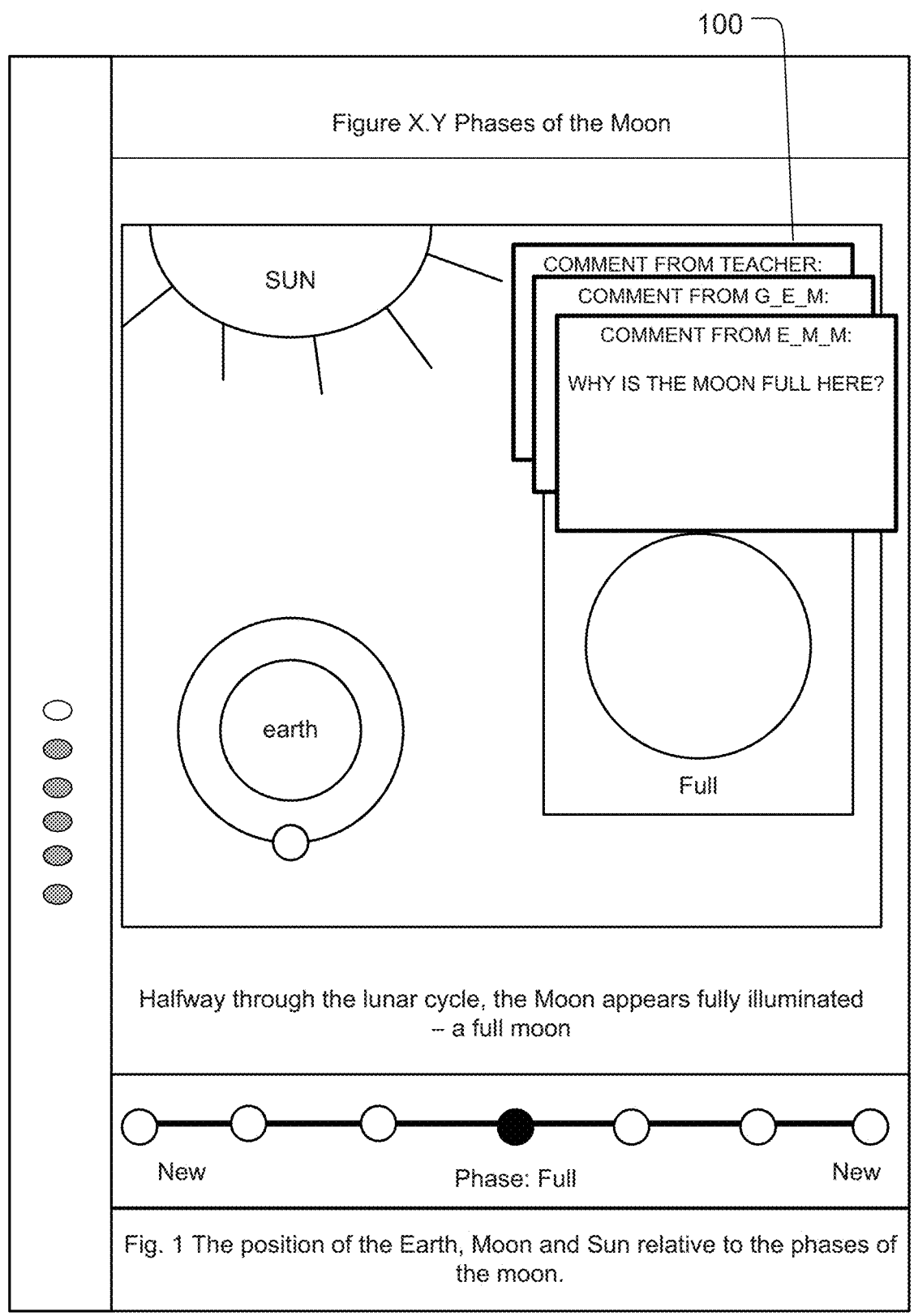
FIG. 1A shows an example interaction according to some embodiments of the present disclosure.

Disclosed in some examples are various systems and methods for interacting with one or more content portions of interactive electronic content. Example interactions include adding notes, discussions, highlighting, annotating, copying, or the like. These interactions may be created by publishers or educators to provide additional information to content users. Additionally, the interactions may be created by one or more content users interacting with the interactive electronic content across one or more computing platforms. These interactions may be attached to, or associated with, one or more portions of the interactive electronic content. For example, the interaction may be displayed with or near the interactive content portion to which it is associated. Additionally, since the interaction is attached to one or more content portions, those content portions may be moved around in the interactive content and the interactions may follow the content portions. The interactions may be social in that an interaction created by one content user may be visible to other content users. In some examples, interactions created by one user may be further interacted with by other content users.

Interactive electronic content may be information, experiences, and idea expressions which may provide value for an end user and which may be stored electronically. In some examples, the interactive electronic content may be educational, recreational, informative, and/or advertising content, and the like. The ideas and the expressions of the interactive electronic content may be conveyed to a user through the use of one or more text, graphics, audio, visual, and/or audio-visual elements or portions. In some examples, the interactive electronic content may include electronic textbooks, electronic pamphlets, electronic workbooks, e-books, and the like. In some examples, the interactive electronic content may not be a complete work, but may be portions of a work. Interactive electronic content may be stored according to any number or combination of electronic formats including markup language files (extensible markup language or XML, hypertext markup language or HTML, Cascading Style Sheets, EPUB open e-book standard or the like), graphics interchange format (GIF), portable network graphics (PNG), joint photographic experts group format (JPEG), exchangeable image file format (EXIF), tagged image file format (TIFF), raw format, bitmap (bmp), scalable vector graphics (SVG), postscript (PS), portable document format (PDF), shockwave flash (SWF), WAV format, MP3, Apple lossless (m4a), mpeg 4, and the like.

In some examples, the interactive content may be divided into one or more content portions. Content portions may be a particular item of content (such as an image file, a video, an audio file, or one or more words or text sections), or may consist of multiple content items arranged in a particular fashion. For example, content portions may be a plurality of words, a series of images, sequences of video or audio content, or a page, chapter, or section of the interactive content.

In some examples, each content portion, or subportions thereof may contain an identifier. This identifier may be a numeric value, alphanumeric value, semantic representation, or any other value which may serve as a way of uniquely identifying one or more content portions. Each identifier may be unique across any desired scope. For example, the identifier may be globally unique such that the identifier for every content portion across all interactive works is unique. In other examples, the identifier may be unique across a single interactive work or a series of one or more interactive works. In still other examples, the identifier may be unique for only a portion of an interactive work. In some examples, the identifier of each content portion may be included in a markup file describing the content or the content portion.

In some examples, an identifier may be assigned randomly to the content portions. In some examples, an identifier with a sufficiently large number of bits may be used to ensure uniqueness. For example, a 128-bit identifier may be assigned randomly to each content portion. Because of the large range of possible identifiers, if a proper random number generator is used, there would be a low probability of a collision.

Interactive electronic content may provide for various interactions by and with end users. An interaction may be an exchange of input and output between a user and the interactive content or other users. Interactions may include highlighting a portion of the content, making notes, posting new or additional content or asking questions on portions of the content, and the like. These interactions may then be incorporated into the content such that the highlights, notes, content, and the like may be displayed along with the interactive electronic content. These interactions may be displayed for the content user leaving the interaction and/or some other user. In some examples, the interactions may be social such that the interactions may be shared, visible by, and interacted with, other users of the electronic content.

In some examples, any or all portions of the interactive content may be the subject of an interaction. Interactions may relate to text portions, audio portions, image portions, video portions, web hyperlinks, interactive presentations or exhibits, content assessments, animations and the like. An interactive exhibit allows a user to interact with an exhibit through modification of one or more user adjustable dynamic visual elements and is described in detail in U.S. patent application Ser. No. 13/207,141 entitled "INTERACTIVE EXHIBITS" to Golden, and which is incorporated herein in its entirety. Content assessments may be integrated with the interactive content and may test a content user's knowledge of one or more portions of the interactive electronic content. Various assessments are described in U.S. patent application Ser. No. 13/019,211 entitled "SYSTEM AND METHODS FOR CROSS PLATFORM INTERACTIVE ELECTRONIC BOOKS" to MacInnis, and which is incorporated herein in its entirety.

In order for the system to properly display the interactions with the content to which it relates, interactions may be associated with content portions by utilizing the identifiers of the various content portions to associate a particular interaction with a particular portion of content. For example, to associate a particular interaction with a particular portion of content, the identifier of the content portion may be included in interaction information about the interaction. The interaction information may be a data structure that describes the interaction and may include the identification of the content portion, the interaction type, interaction contents (e.g. the actual content of the interaction such as the text of a note, or the like), and the like. The content identifiers provide a way for the system to locate the proper content portion which is associated with a particular interaction even if the content portion is moved or re-ordered because these identifiers may be unique across all works as well as within a work. Similarly, interactions created in one content portion may appear with the same content portions in different works because in some examples the identifiers may be the same for that content portion in both works. This also allows content portion ordering to be changed without affecting interaction associations. For example, content may be dynamically sequenced such as described in U.S. patent application Ser. No. 12/911,247 entitled "METHODS FOR SEQUENCING ELECTRONIC MEDIA CONTENT" to Cho, which is hereby incorporated herein in its entirety. Changing the ordering of the content will not affect the interactions.

In some examples, the interaction information may include one or more identifiers to indicate that an interaction may span multiple content portions. In some examples, the interaction information may specify a location of the interaction within a particular content portion. For example, the interaction information may specify that the interaction begins at a certain character within the content portion (or word, pixel, time period within a video or audio sequence, interval, or offset) and lasts a certain number of characters (or word, pixel, interval, or offset). For example, if the XML, code that describes the interactive content includes the following:

<p id="1234">These are</p>
<p id="5678">two short paragraphs </p>

If a user places a highlight on the words "are two short", the identification of the content portion in the interaction information for the highlight may look like:

[1234,(1, 1)][567840,1)]

This structure indicates that for content portion with id "1234", that the interaction starts and ends at character 1 (offsets start with 0 so that "These"=0, "are"=1), and for content portion "5678", the interaction starts with character 0 and ends with character 1 ("two short").

In some examples, this interactive electronic content may be rendered by a client application executing on a computing platform. The client software may be executable on any number of suitable execution environments including a tablet P.C. such as the IPAD® manufactured by Apple Inc., of Cupertino Calif., or tablet computing devices executing the ANDROID® operating system, such as the GALAXY TAB® 10.1 manufactured by Samsung Electronics Co., Ltd., of Seoul, South Korea, a laptop computer, a desktop computer, a smartphone or other cellular telephone, a portable media player such as an IPOD® manufactured by Apple, or the like.

Example Interactions

Various interaction types may be implemented. One example interaction is a note. Users may add their own customized notes to a portion of the content. Notes may contain text, graphics, links, video, audio, or the like. Another example interaction is a question. Questions may be a note with the content of the note being a question (and recognized with a '?' character), or may be delineated as a special type of interaction. In some examples, notes and questions may be shared with others. Additionally, other content users, educators, or content creators may start a discussion around the note or question.

Figure 1B:
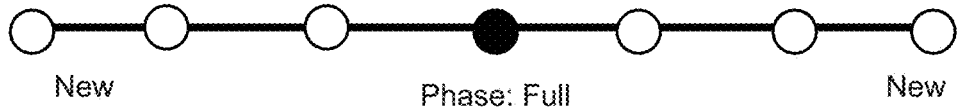
FIG. 1B shows an example interaction according to some embodiments of the present disclosure.

A discussion in some examples may be an exchange of views on some topic or a conversation about the topic. A discussion may be a series of one or more notes or questions about a particular topic posted by one or more interactive content users, educators, content creators, or other authorized users. A discussion may appear entirely within a single note, as a series of notes, a stack of notes and the like. FIG. 1A illustrates a discussion 100 started about a particular portion of electronic content which displays an interactive demonstration of lunar orbit and phase. The discussion is a series of one or more notes attached to the content portion. Each user's contribution to the discussion may be a separate note added to the other notes. The discussion may be sorted by first to post or last to post, or some other method. FIG. 1B illustrates a discussion 110 showing all user notes in a single visible interaction.

Figure 1C:
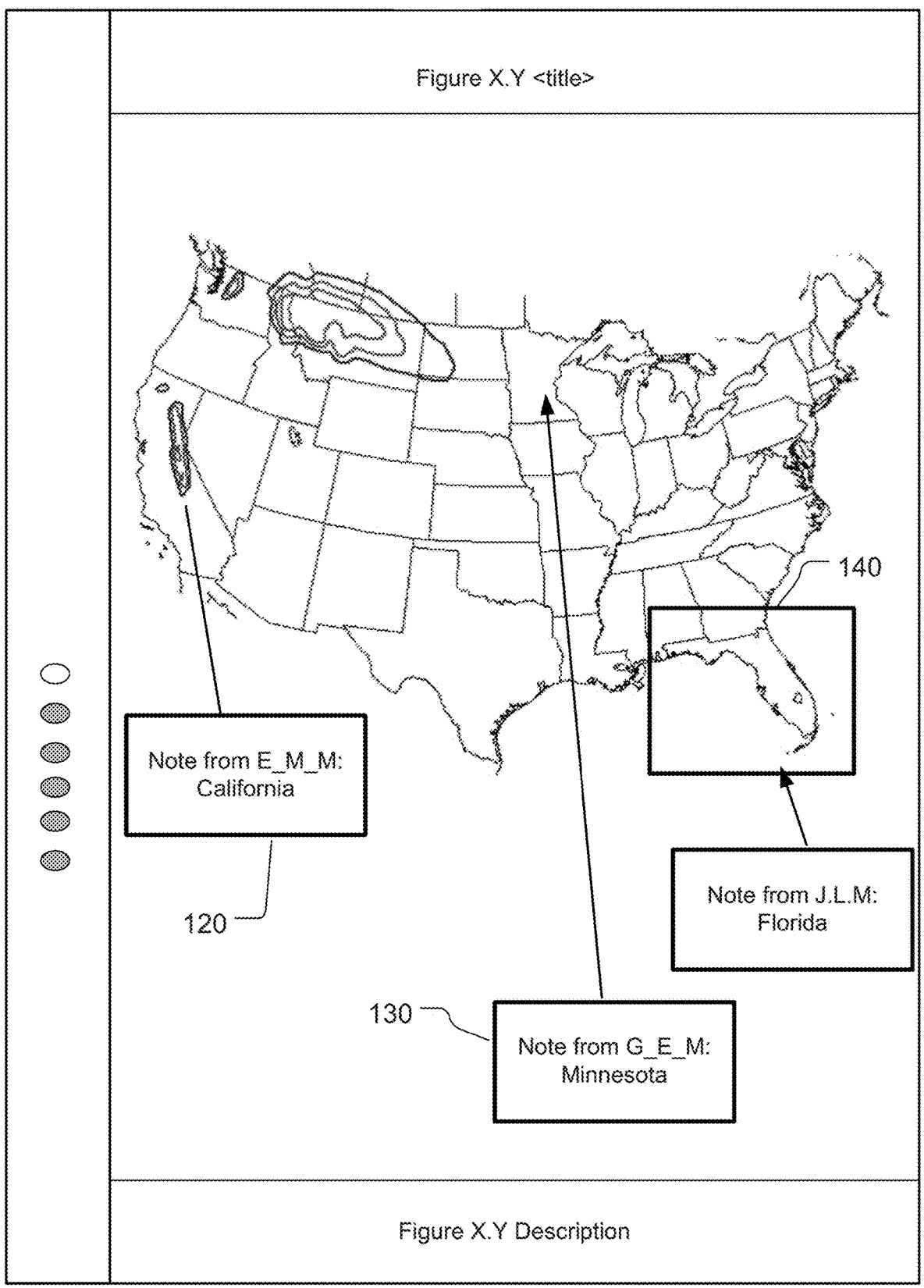
FIG. 1C shows an example interaction according to some embodiments of the present disclosure.

Another example interaction includes a content highlight. A content user may choose to highlight certain portions of content. The highlighted content may then be shown contrasted against the rest of the content. For example, if the content portion is text, the text may be displayed with a yellow background to highlight this text portion. Highlights may be highlights of images or videos as well. In these examples, the point of interest may be denoted by a box, an effect applied to a selected area of the image or video (e.g. the selected area may be "zoomed" in to show more detail, may be of a different color or color palette, may be shown in sepia or some other filter, or the like), an arrow pointing to the area (possibly with one or more notes), and the like. Several examples for interacting with an image are shown in FIG. 1C. For example, a note with a leader line to a point of interest on the image (map of the United States) is shown at 120 and at 130. In this case, the leader line points to various states with notes identifying those states. A bounding box highlights the state of Florida along with a leader line and a note at 140.

Some interactions with audio, video, or audio-video may have spatial and temporal components within the content portion to which they relate. For example, for image interactions, an interaction may relate to the entire image, or may relate to a particular section of the image. In examples in which the interaction relates to a section of the image, the interaction information may include information identifying a particular point or section of the image (such as with the image highlighting). This point or section may be an (x, y) coordinate point, an (x, y, z) coordinate point in a three-dimensional representation, a bounding rectangle (or some other shape, or circle), a location within a vector graphic or the like. This spatial component may be described in the interaction information by coordinate points or through some other spatial description.

Interactions related to audio, video, or audio-video content portions may have a temporal component. Thus, the interaction may relate to particular frames (or timestamps) of the video or a certain time offset in the audio, and in some examples, a particular duration. In these cases, the interaction may only appear while the user is viewing or listening to those certain temporal sections defined by the time offset and the duration. These temporal aspects may be described in the interaction information by an offset into the content portion in time such as a timestamp, frame number, or the like and in some examples, also a duration described by a specific number of frames, time duration or the like.

In yet other examples, both a spatial and a temporal dimension may exist such that both an identification of time (or frame) and space may be provided. For example, in the case of a video, it is possible to specify not only the frames for which the interaction occurs, but also the location of the interaction within those frames. In some examples, the spatial dimension may change over time such that for one group of frames, the interaction relates to one spatial dimension, but for another group of frames, the interaction may relate to a different spatial dimension. In the example of a video, this may be useful if the interaction relates to objects that move in the video, by changing the spatial coordinates of the interaction, the interaction may track the object as it moves in the video. In these examples, the interaction may be defined by (spatial, time) pairs such that each pair describes the interaction's spatial location for a particular time duration.

Figure 1D:
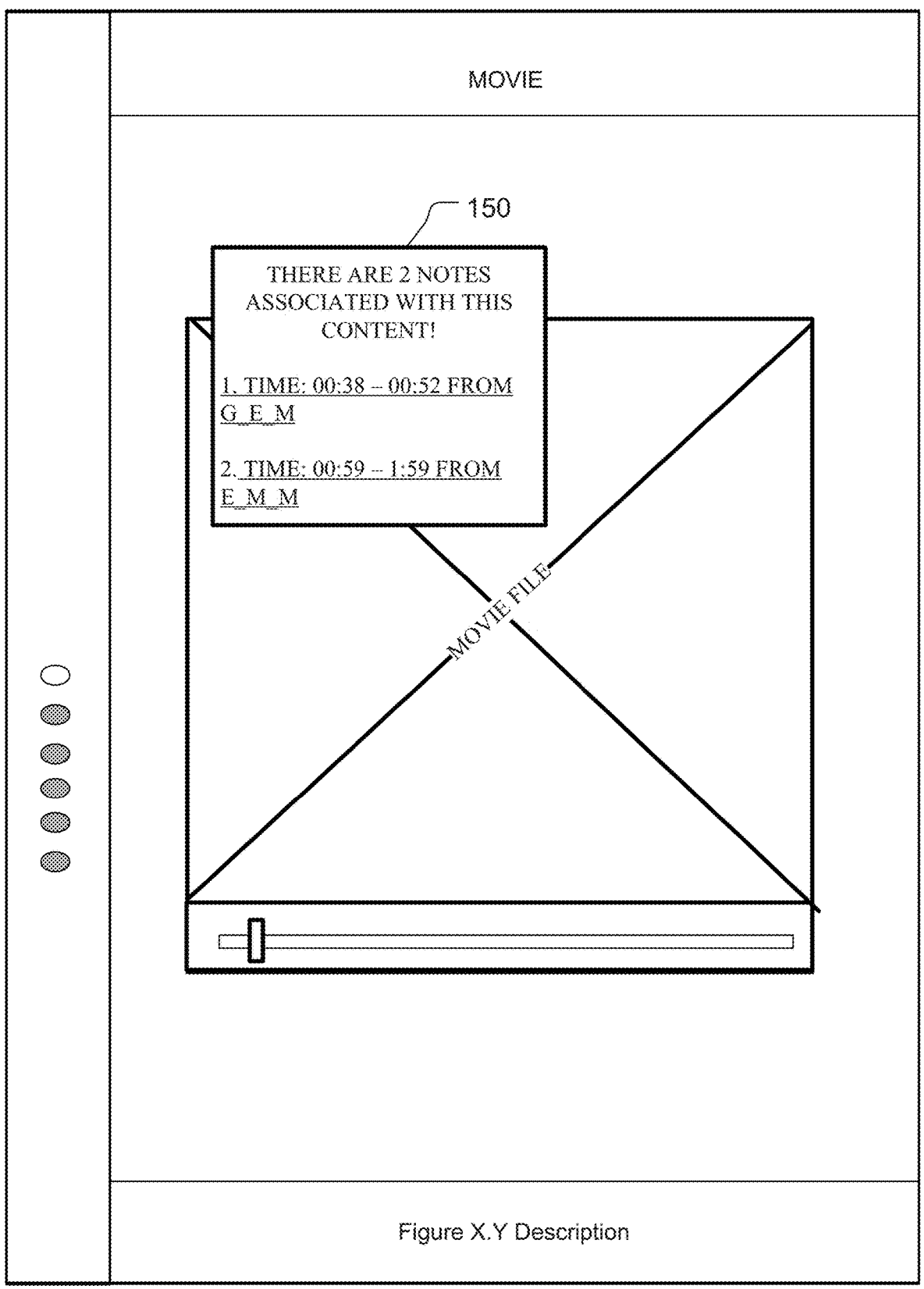
FIG. 1D shows an example interaction according to some embodiments of the present disclosure.

In some examples, a separate interaction may be available once a user creates an interaction in certain content portions. This separate interaction alerts the content viewer to the presence of an interaction somewhere in the content portion and may provide a list of all interactions with links to those interactions. Utilizing the link (e.g. by "clicking" the link) may take the user to the particular place in the content portion to which the interaction relates. For example, a user may create an interaction that appears in certain portions of a video content portion. Upon opening up the video portion, the system may present the user with the additional interaction which may be a list of all the other interactions in the video. Clicking on the interactions in the list "jumps" the user to that portion of the video associated with the selected interaction. FIG. 1D presents an example of such interaction 150 with links to various interactions in the video. Shown is the user who created the interaction along with the time interval in the video associated with such interaction.

Another example interaction may include associating additional content links to certain content. These links may be links to other content within the interactive content, links to other works of interactive content, or links to external resources (e.g. external websites).

Yet another example interaction may be a user opening a particular content portion. This interaction may allow other authorized users to see what this user is reading. A visual indication of presence is described in U.S. patent application Ser. No. 12/731,656 to MacInnis entitled "SYSTEM AND METHODS FOR READING LOCATION AWARENESS" which is hereby incorporated herein in its entirety. Such interactions include an indication of what another user or users are viewing. The interaction may include showing what content portions other users in your geolocation or near your geolocation are currently or have been viewing or interacting with, showing what content portions other users in a group (e.g. social networking friends, classmates, and the like) are currently or have been viewing or interacting with, or the like.

Yet another example interaction may include adding an embedded application to certain content. The embedded application may be executable by a user viewing the associated content portion. The application may be automatically executed when the user views the content portion, or may require interaction from the user to execute (e.g. tapping or clicking on it, installing it, or the like). The application may be a stand-alone application which may run in an i-frame or some other separate execution environment, or may integrate with the client application to modify the presentation of the electronic content or the client application.

Interactions in some examples may be combined. For example, highlighting interactions may be combined with notes interactions and the like. This combination may consist of the user separately making a highlighting interaction and a notes interaction associated with the same content portion (in which case they may be treated either as separate interactions, or the system may recognize they relate to the same content portion and link them). In other examples, when creating the interaction, users may be presented with a choice to add additional interactions and interaction types. For example, a note may allow users to type textual notes, but also allow the user to add graphics, videos, and the like.

Interactions may be created automatically by the system as a way of alerting a user to another interaction created by a different user. For example, an interaction may pop up at the user's current reading location to notify the user of a response or post by a different user to a discussion that the content user is participating in. In other examples, system-created interactions may include a suggested notes interaction. The system may recommend notes, discussions, or other interactions created by other users based upon a number of factors. For example, interactions created by an author or teacher may be recommended. Interactions created by friends or other individuals who are linked in a social network or other group to the content user may be highlighted. Interactions by individuals in the same school, school cohort, or educational institution may be highlighted. Individuals who have a high number of followers (the system may allow a user to "follow" interactions another user) either on system 1000 or on another external network service (e.g. a social networking service such as TWITTER®). Additionally, individuals that score well on interactive assessments may have their interactions recommended to other users. Interactions from other users in the content user's geographic area may be recommended to other users. Additionally, interactions may be ratable by other users and highly rated interactions may be recommended. Recommended interactions may be shown on a separate page to a user, or may be displayed in the margins of the content or may be shown as an indication (e.g. a graphic) that may link to the recommended interaction.

In other examples, interactions may be generated to show a user which other users are geographically close to the user and in some examples the interaction may show the user's location. In some examples, this may only be users in a particular group (e.g. social networking friends, classmates, or the like), and/or users viewing particular content portions. This may allow the content user to seek out study partners. In some examples, the system may automatically connect one or more geographically close content users to a live chat session that may allow the users to arrange to meet or discuss the content.

In some examples, the popularity of an interaction may also be displayed. For example, a discussion with a relatively large number of posts about a particular topic may be labeled as "hot" with a fire graphic in the margins next to the content portion it relates, or included with the interaction itself. Other interactions may include displaying a heat map, either in the margins of the content, or overlaid on top of the interactive content showing which sections are heavily interacted with by other users.

Creating Interactions

The content users or other authorized users may create interactions and associate those interactions with the content in a variety of ways. Some examples include highlighting a portion of content (e.g. using one or more touch inputs or holding down a mouse button as the content user moves the cursor over the content portion), highlighting a portion of the interactive content and entering additional input (such as a mouse click, a tap of a touch screen device, a selection from a menu, touch gestures, or the like), selecting a menu option, shaking the computing device to activate an accelerometer, rotating the computing device, other motion gestures (e.g. shaking then rotating, tilting, or the like), using a keystroke or set of keystrokes, or one or more inputs from other input devices, or the like.

In some examples, educators (or authors, group leaders, or the like) may create content interactions on one or more content portions. These interactions may be shared with content users either in their class, all content users, content users in a particular group, or the like. In some examples, such interactions can be used by the educators to enhance the learning experience for their students (or other content users) by providing clarifying notes and presentations. In some examples, educators may view their students' interactions.

In some examples, a user may set privacy preferences to allow or restrict sharing an interaction. The student-teacher relationship may override the interaction creator's interaction privacy preferences with respect to the interactive content. Thus, for example, even though the content user has marked an interaction as private, a teacher of that content user may be able to view those interactions. In other examples, the content user's privacy settings may not be overridden by the teacher-student association and will prevent the educator from viewing the interaction. Thus an interaction marked private may not be viewable by an educator.

Figure 1E:
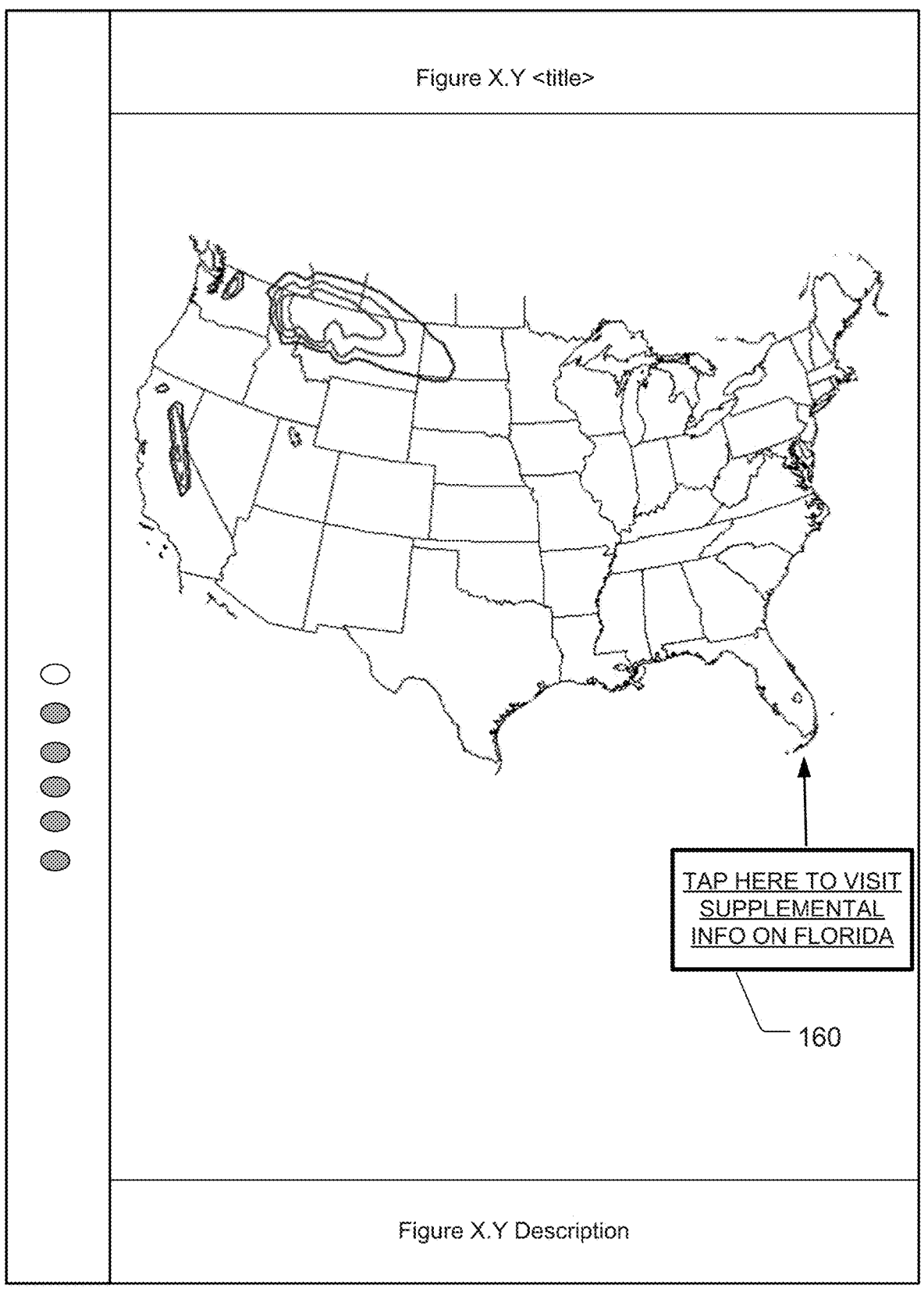
FIG. 1E shows an example interaction according to some embodiments of the present disclosure.

In other examples, the content creators may provide one or more interactions. Such interactions may be to provide supplementary material, content updates, or clarifications. In some examples, the content creators may provide supplementary material as an optional download. In other examples, the supplementary material may be a separate content work. Downloading, purchasing, or executing a supplemental work (which supplements the original work) may cause a plurality of interactions to be automatically associated with one or more content portions of the original interactive electronic content work. These interactions may comprise links to the supplemental information that relates to the content portion, such that the supplement is integrated into the interactive content. For example, if the interactive content work is a biology textbook, and the user is viewing content related to the human ear, an interaction may be displayed along with the content that links to additional information in the supplement regarding the human ear. FIG. 1E shows an example 160 of a supplemental interaction placed inside a content portion. The user may simply click or tap on the interaction in 160 and be taken to the supplemental information.

In yet other examples, one or more interactions such as notes and discussions may be exported to a network service, such as an Internet site. For example, the interaction may be sent to FACEBOOK® where users there can discuss the interaction. In some examples, the content portion, or a link to the content portion, to which the interaction relates may also be exported to FACEBOOK® to provide context for the interaction. In yet other examples, a preceding or subsequent content portion may also be exported to FACEBOOK® to provide additional context. Any additional discussion or interactions added to the interaction at the external Internet site may be imported back into the interactive electronic content (and may be displayed) so that the interactions may be linked between the client application and the network service.

Social Interactions and Privacy

In some examples, interactions created by one content user may be shared with, and viewable by, other content users, educators, content creators, administrators, or other authorized users. In some examples, interactions may be public in that they may be shared and/or viewable by any interested content users, educators, content creators or the like. In other examples, the interactions may be semi-private in that they may be shared with some content users, educators, or content creators and not others. In yet other examples, the interactions may be private and not shared with anyone else. Interactions may have various permissions associated with them which specify to what extent a different user may view, modify, delete, or add additional information to the interaction.

Whether or not the interactions are shared may depend on a per-interaction selection by the creator of the interaction to offer control over each individual interaction or a global setting in which the user decides on a global basis whether or not to share the interactions. In other examples, the user may specify sharing preferences by interaction type. For example, question interactions may be shared only with educators whereas discussions may be shared with other content users and highlights may not be shared at all.

Interactions or other content users may be ignored (e.g. not displayed to a user). For example, if one user is spamming other users with unsolicited, unhelpful, threatening, or harassing interactions, that user may be ignored or that interaction may be ignored.

In some examples, interactions may be shared or viewable based upon one or more user groups. Any of the interactions described in this application may be filtered so that only interactions by particular members of one or more groups may be displayed. The groups may be automatically created (e.g. all content users within a certain geolocation, all content users viewing the content at that particular time, or the like), or may be self-selected (a group of friends who decide to share interactions, a group of connections on a social networking site, or the like). In some examples, educators or other authorized users may create and register groups. For example, an educator may create a group with all content users from their class. In some examples, a user may create a group by associating themselves with one or more of their friends. In other examples, users may link their network service accounts (e.g. their social networking accounts) with the interactive content such that individuals who are "friends" or connections on a network service may constitute a group and share interactions. Additionally, interactions may be exported to these network services (e.g. social networking services, bulletin boards, or the like) and additional interactions created on the network service may then be incorporated into the interactive content.

In some examples a network service may be an online service, platform or site capable of storing and retrieving data of or about a user, product, or service, and presenting the user or other users with that data across a network. The network service may be internal in that it may be associated in some way with the interaction service, or may be external in that it may not be associated with the interaction service (apart from any necessary communication in order to post interactions and receive follow up interactions). In some examples the network service may display this data as part of a web page or other interactive or static display. In some examples, the network service may be a social networking service, a job posting service, a classified posting service, an online retailer, or the like. A social networking service may be a type of network service that focuses on building and reflecting social networks or social relations among people, who, for example, share interests and/or activities. A social network service may consist of a representation of each user (often a profile), his/her social links, and a variety of additional services. Most social network services are web based and provide means for users to interact over the Internet, such as e-mail and instant messaging. Example social networking services include LINKEDIN® of Mountain View, Calif.; TWITTER® of San Francisco, Calif.; or FACEBOOK® of Menlo Park, Calif.

Once interactions are created and/or shared, they may be integrated into the interactive content. Thus, interactions created by the current content user may be shown, as well as interactions from users who have shared their interactions with the current content user. For example, FIGS. 1A and 1B show interactions created by other content users 100, 110. In some examples, this may include showing the interactions in the margins of the content, inline with the content, or on a separate page or section of the content. In some examples, this display may include the actual content of the interaction (e.g. text, graphics, audio, video, audio visual), or may include a representation of the content (e.g. a link to the actual interaction, a thumbnail image, or some other representation that allows a content viewer to ascertain that there is an interaction).

Example Social Interaction System

Figure 2:
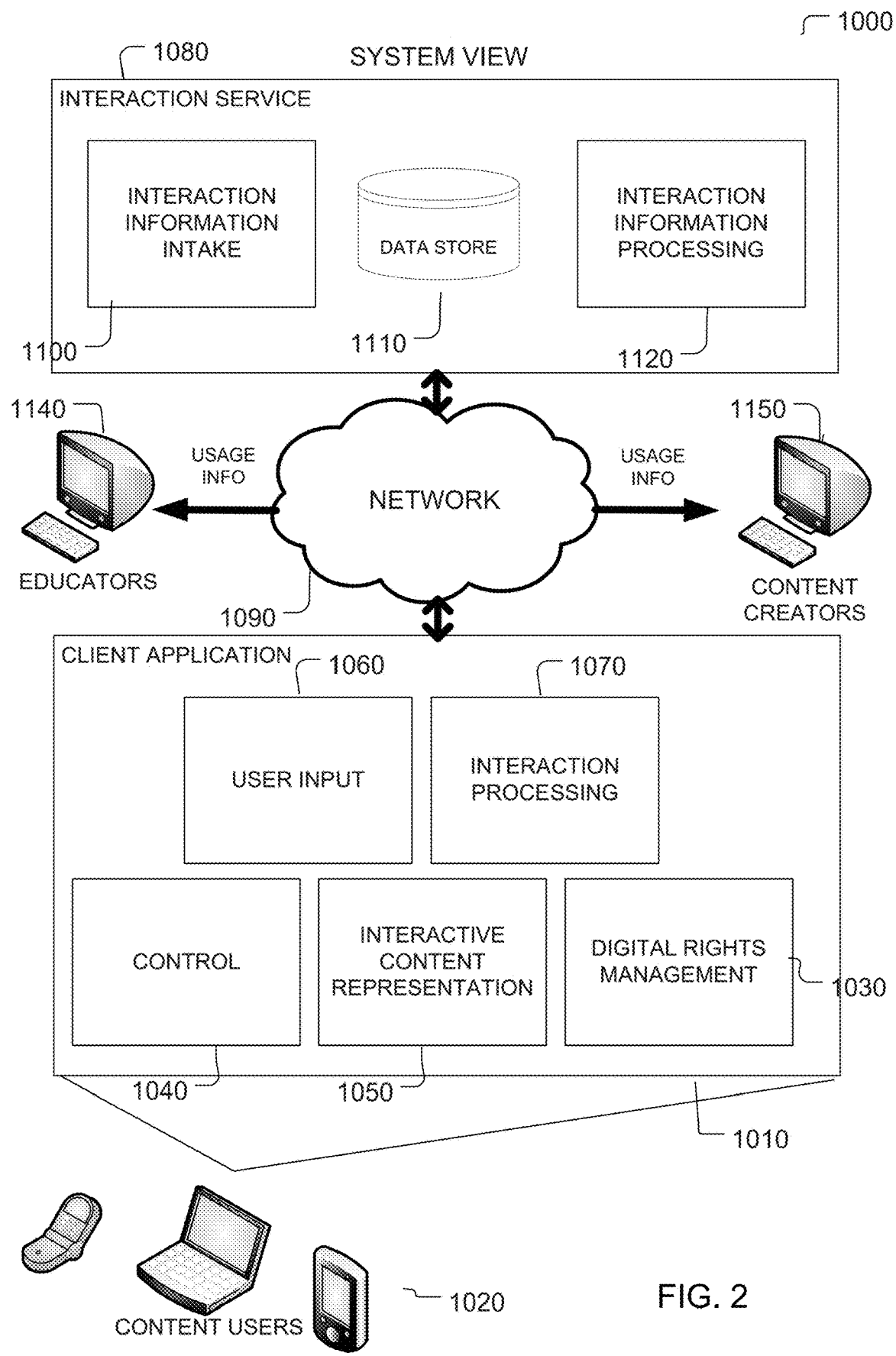
FIG. 2 shows a schematic of an object oriented interaction system according to some embodiments of the present disclosure

Turning now to FIG. 2, an example social interactions system 1000 is shown. Client application 1010 may run on computing platform 1020 of content users and may interface with the hardware and operating system of the computing platform 1020. Computing platform 1020 may include an operating system layer executing on computing hardware. The operating system layer and the hardware of the computing platform may provide the functions required to run the application software, including the processor, system memory, storage, network interface, TCP/IP stack or other protocol stack, and application programming interfaces for the development of software applications. The hardware device and operating system may be of any variation including traditional PC-based operating systems, mobile device operating systems or network-based operating systems that abstract the hardware layer from the application programming interface. Some examples of operating systems include Microsoft WINDOWS®, developed by Microsoft Corp. of Redmond, Wash., UNIX®, LINUX®, iOS®, MacOS®, ANDROID®, and the like.

Client application 1010 represents the user-level executable the content user launches on the client device 1020 in order to access the interactive electronic content. In some examples, all functions of client application 1010 may be inside the client application. In other examples, only selected portions are encapsulated in client application 1010 and may run in other components of system 1000.

In some examples, digital rights management process 1030 or "DRM" process authorizes and authenticates a particular user or device in order to allow the user to access appropriate media from the electronic content. DRM may authorize an entire electronic interactive content work, or selected portions thereof. DRM may also prevent the user and device from accessing electronic content or segments thereof that the user is not authorized to access. In some examples, DRM may also be configured to prevent or control a user or system from extracting text, images, video or other protected assets, and transmitting those assets to another device or writing them out to disk for later retrieval or sharing. DRM process may also authorize the exportation of content portions to network services. This may be based upon instructions encoded into the interactive electronic content by the content creators.

Based on the description of the interactive content which is stored in the interactive content representation 1050, control module 1040 may generate commands for rendering the interactive electronic content which may then be issued to the operating system at the appropriate time to display the various portions of electronic content. The user input module 1060 may detect and/or process one or more user inputs, including user inputs corresponding to interactions and pass along information regarding the interaction to the control module 1040 and the interaction processor 1070. The control module 1040 may respond to the user inputs and interactions handled by user input module 1060 and may cause the displayed interactive content to be updated in response to the user interactions. Control module 1040 may also present the content users with various privacy and interactions options which control how interactions are to be shared and which interactions of others are to be displayed. The content user may then select which options they prefer. User interaction preferences may be communicated with interaction processing 1070.

When the user initiates an interaction, the user input module 1060 or control module 1040 may send interaction information which may include the identification number corresponding to the content portion associated with the interaction, the type of interaction, the contents of the interaction, the content user identifier, or the like to interaction processing 1070. Interaction processor 1070 in some examples may determine additional information about the interaction (e.g. geolocation of the user, the local time, information about the client device 1020, or the like) by querying other components (e.g. DRM 1030, or the operating system). Interaction processor 1070 may then store the interaction information locally at the computing device 1020, and/or pass the interaction to the interaction service 1080. The interaction information may be stored locally if the interaction is to be private to this particular content user, or if a network connection is not present to interaction service 1080. In other examples, the interaction information may be sent (or queued for sending) to the interaction service 1080. This may be done so that interactions may be shared. In other examples, even if the interaction is not to be shared, the interaction processing module 1070 may pass the interaction information to the interaction service 1080 for remote storage and/or processing. The interaction information may contain interaction preference information (e.g. such as privacy settings). In other examples, the interaction service 1080 may be sent the interaction preference information separately by client application 1010 (e.g. at client application 1010 startup, at an earlier registration, or whenever the content user changes the privacy settings, or the like).

In some examples, the user input 1060 and control module 1040 may also notify interaction processing module 1070 of certain events related to the interactive content. For example, upon loading an interactive content work, or a portion thereof, the control module 1040 may notify the interaction processing module 1070 that a particular work, or a particular content portion of the work, was loaded. Interaction processing module 1070 may then poll interaction service 1080 for various interactions associated with that interactive content work or portion thereof. Interaction processing 1070 may then coordinate with control module 1040 to cause control module 1040 to integrate the various interactions that are received from interaction service 1080 with the interactive content.

When interaction processing module 1070 of client application 1010 forwards interactions to the interaction service 1080 over network 1090, the interaction information intake 1100 of interaction service 1080 receives the interaction information and stores it in data storage 1110. Interaction service 1080 may receive, store, and/or process interaction information from a plurality of client applications. Data store 1110 may be any non-volatile computer readable storage that is configured to store interaction information. In some examples, data store 1110 may be a relational database.

Interaction information processing 1120 may receive requests from client application 1010 for interaction information relating to one or more content portions. Interaction information processing 1120 may then retrieve the interaction information associated with those content portions from data store 1110. Interaction information processing 1120 may also verify that the creator of the stored interaction has authorized the requesting user of client application 1010 to view their interaction. In some examples, this may include comparing a user identification of the content user requesting the interaction with a list of authorized users. In other examples, this may include determining if the user who is requesting the interaction information is a member of one or more authorized user groups. In some examples, the various groups and membership in those groups may be stored in the interaction service. Each group may have a unique identifier which may be used in the privacy preference information to grant or deny access to one or more groups. The interaction service may check a user identification included in a request for interaction information against a list of members of particular groups authorized to access a particular interaction. If the user is listed as a member of the group, the interaction information may be sent to the user. In yet other examples, the interaction may be public and may not need to be checked for authorization, or may be private and may be forbidden to be shared. Any interaction relating to the requested content portions and which may be shared with the requestor may then be sent to client application 1010. In yet other examples, if the requesting user is someone with appropriate administrator or educator credentials, the interaction information processor 1120 may pass along the interaction even if not authorized.

Additionally, educators 1140 and content creators 1150 may access the interaction information and/or leave interactions through their own client application (which may be the same or similar to client application 1010) or through a programming application executing on their computer terminals. Additionally, educators 1140 and content creators 1150 may access the interaction information and/or leave interactions through a web based client in which the educators 1140 and content creators 1150 may use a web-browser, JavaScript, or the like to access a web server associated with interaction service 1080.

Example Social Interaction Method

Figure 3:
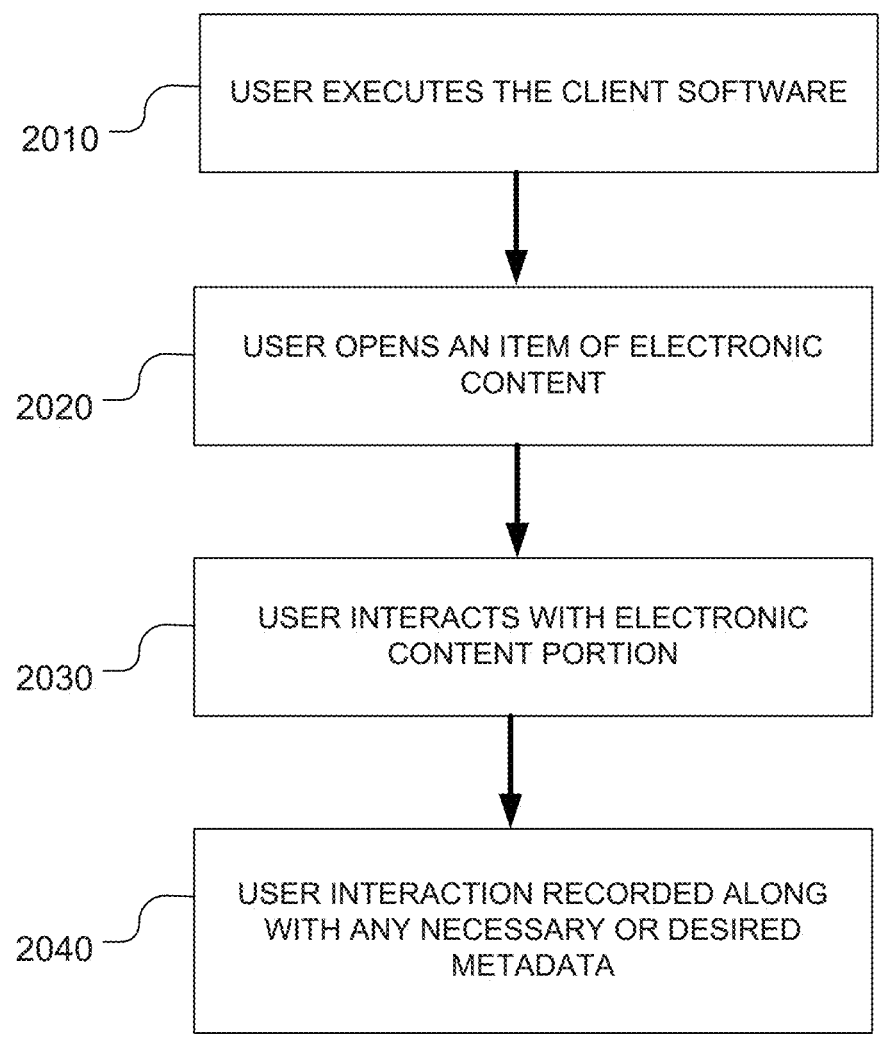
FIG. 3 shows an example method of recording interaction information according to some embodiments of the present disclosure.

Turning now to FIG. 3, an example method is shown. At operation 2010, a content user executes the client application. At operation 2020, the user selects and opens a work of electronic content. At operation 2030, the user interacts with a portion of the electronic content. At operation 2040, the client application records the interaction, along with any necessary or desired metadata (e.g. time of the interaction, the identity of the content user making the interaction, and the like).

Figure 4:
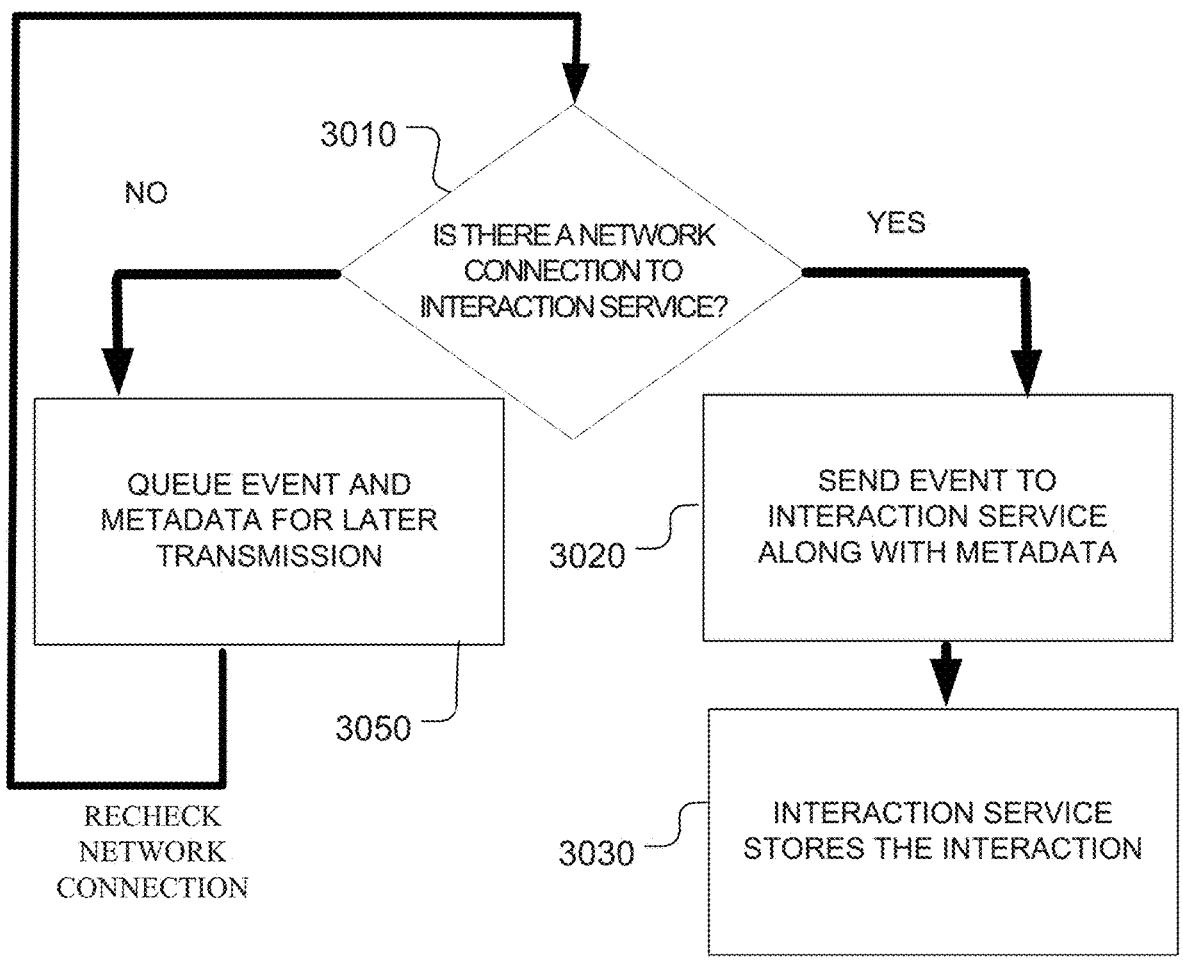
FIG. 4 shows a flowchart of an example method of sending interaction information to an interaction service according to some embodiments of the present disclosure.

Continuing with FIG. 4, the client application determines at operation 3010 if there is a network connection to the interaction service. If there is not a network connection, the interaction information may be queued for later transmission at operation 3050. The system may continue to check for a network connection and if one is found, may send the queued interaction information to interaction service 1080. If there is a network connection, in some examples, the interaction information is sent to the interaction service along with any collected interaction information at operation 3020. In some examples, the interaction preferences of the user who creates the interaction information may also be sent to the interaction service to tell the interaction service whether or not and to what extent this interaction should be shared. In some examples, the client application may not send the interaction to the interaction service even if a network connection is present. For example, the interaction may be marked as private and thus the client application may store the interaction in local storage instead. In some examples, the interaction may be sent to the interaction service even if the interaction is marked as private to utilize non-local storage. At operation 3030 the interaction service stores the interaction in a data store.

Figure 5:
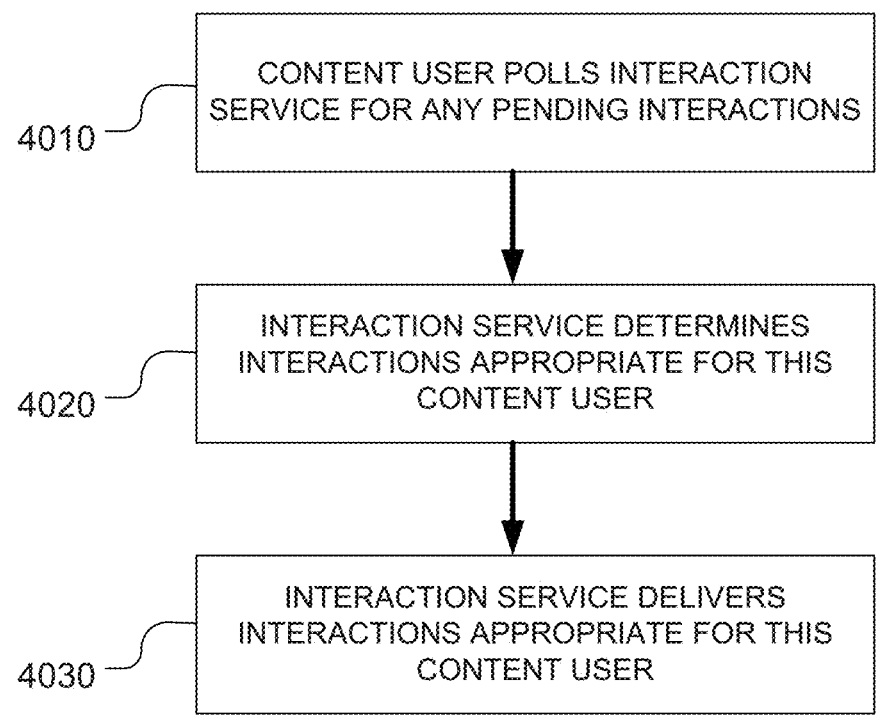
FIG. 5 shows a flowchart of an example method for receiving interaction information from an interaction service according to some embodiments of the present disclosure.

Turning now to FIG. 5, an example method for retrieving interaction information from the interaction service is shown. All interaction information for an electronic work may be retrieved at once upon opening the electronic work (e.g. after operation 2020 in FIG. 3), or the interaction information may be loaded as needed to save memory on the client computing device 1020 (e.g. as certain content portions are opened, interaction information related to that content portions and/or nearby content portions may be loaded). Whenever a client is interested in obtaining interaction information about a portion of the electronic content, the client application may poll the interaction service for interaction information at operation 4010. In some examples, the client application may tell the interaction service which content user is requesting the interaction information and which content portion(s) the client application is interested in.

At operation 4020 the interaction service determines interactions that are appropriate for this content user. Interaction service may determine which interactions related to the particular requested content portion are authorized by the interaction creators to be displayed by the requesting user. In some examples, this may include determining whether the requesting user is a member of an authorized group of users. At operation 4030, the interaction service delivers interactions which relate to the particular content portion which are authorized by the content creators.

Figure 6:
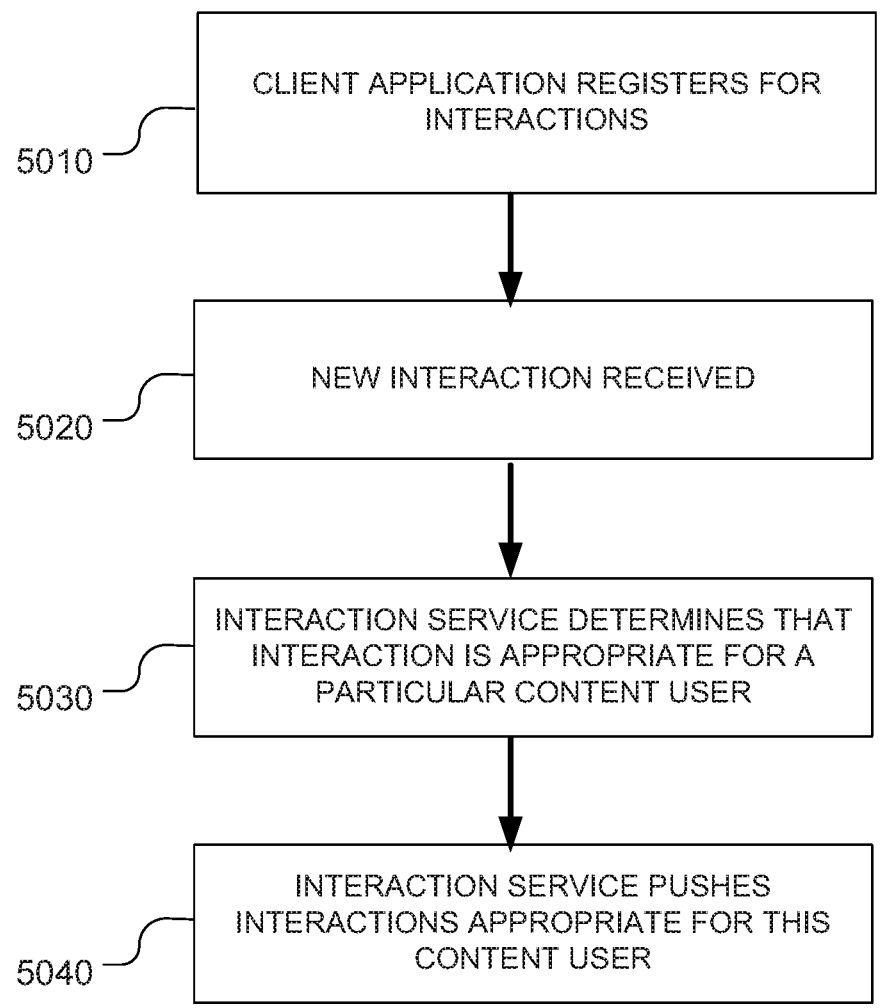
FIG. 6 shows a flowchart of an example method for receiving interaction information from an interaction service according to some embodiments of the present disclosure.

FIG. 6 presents an alternative example in which the interaction service "pushes" interactions to the client applications 1010. At operation 5010, the client application registers with the interaction service for various interactions. In some examples, the client application registers for all interactions or only certain interactions. The client application may specify which interactions to deliver by interaction type, the creator of the interaction, a combination of interaction type and creator, and the like.

At operation 5020, a new interaction is received from one of the client applications at the interaction service. At operation 5030 the newly received interaction may be analyzed to determine whether it applies to the various content users running the various client applications. If the interaction is appropriate for a particular content user, the interaction service may push the interaction to the particular content user at operation 5040. The interaction service may do this for all registered content users. In some examples, the interaction service may not push each individual interaction, but may batch many interactions in order to more efficiently use network and processor resources.

Once the interactions are received by the client device, the client device may then display the various interactions.

Figure 7:
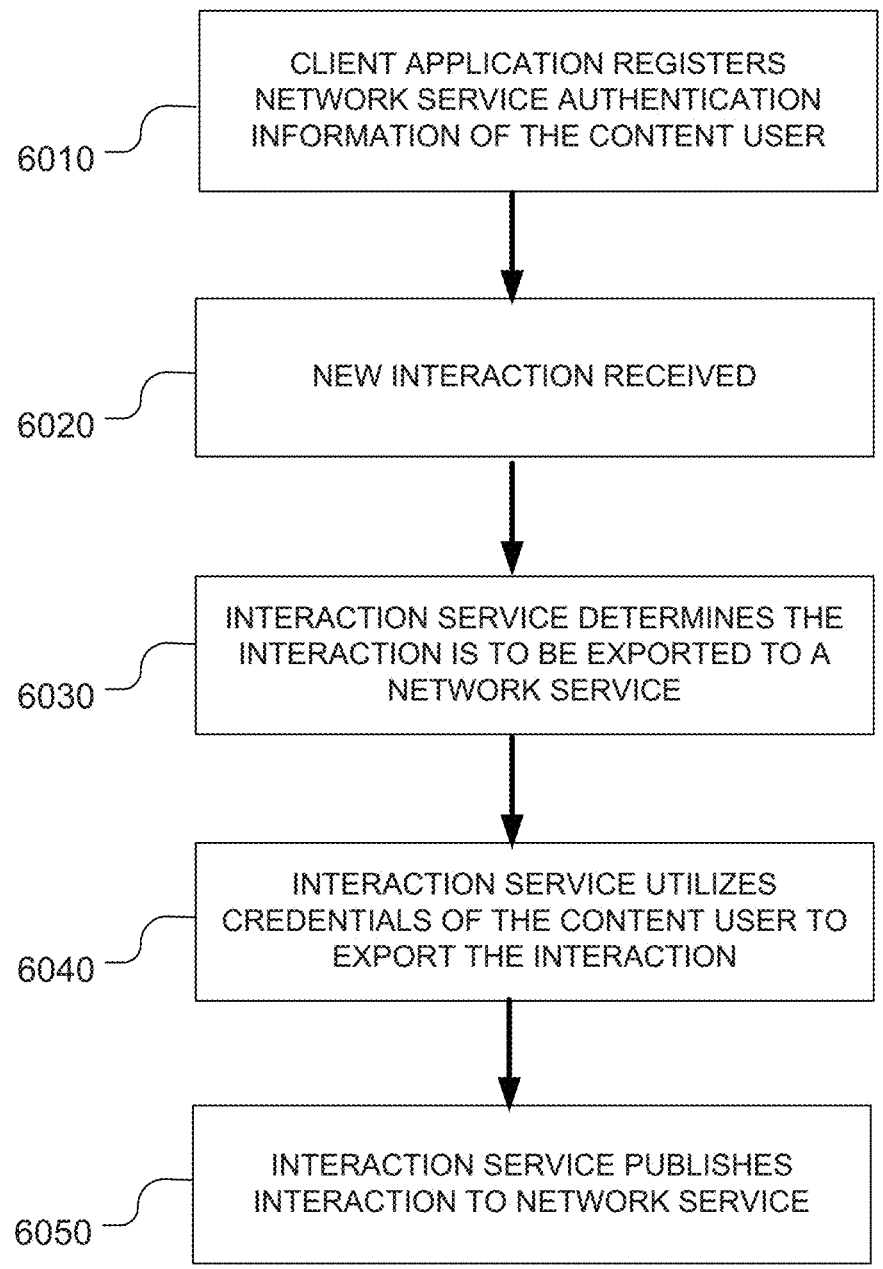
FIG. 7 shows a flowchart of an example method of sharing interaction information with a network service according to some embodiments of the present disclosure.

In some examples, interactions may be exported to one or more internal or external network services, or other applications. For example, the interactions may be exported to one or more social networking services. FIG. 7 shows one example method for exporting the interactions to a network service. Turning now to FIG. 7, at operation 6010 the client application may register any necessary authentication credentials of the content user with the interaction service. These credentials may be provided by the content user. In some examples, this registration may take place when a new content user first launches or downloads the client application, or at a later time, such as when a content user enters the information in a settings or preferences menu. In other examples, when the user decides to export the interaction to a network service (either internal or external), the user may be prompted for the various credentials by the client application which may pass these credentials along to the interaction service.

At operation 6020, interaction information relating to a new interaction is received. At operation 6030, the interaction service determines that the interaction is to be exported to a network service. In some examples, this determination could be made based on information or input from the user entered contemporaneously with the interaction. For example, the client application may have an option when creating interactions which selects the interaction for export. In some examples, the determination for export may be made after the interaction is sent to the interaction service—in which case—a separate message may be used by the client application to inform the interaction service that this interaction is to be exported. In other examples, the content user may utilize a global setting to specify all, none, or certain types of interactions that may be exported.

At operation 6040, the interaction service utilizes credentials of the content user to authenticate with the network service if necessary. At operation 6050, the interaction service may then export the interaction and/or interaction information to the network service. In some examples, the interaction may be exported along with the content portion to which the interaction is associated with. In yet other examples, content portions which are near the content portions to which the interaction is associated with may also be exported to provide additional context. Interactions may be exported according to the various APIs of the network services or through various network conventions such as various Hypertext Transfer Protocol (HTTP) conventions such as GET, PUT, POST, various JavaScript API function calls and the like. For example, a publication to FACE-BOOK® may utilize the FACEBOOK® application programming interface to export the interaction to a user's wall.

Figure 8:
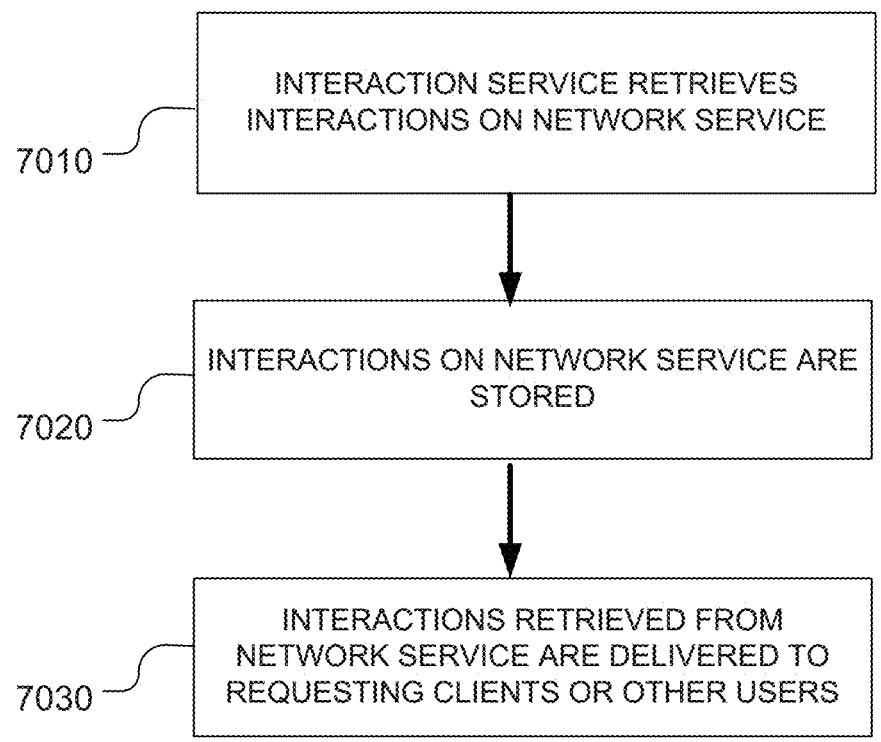
FIG. 8 shows a flowchart of an example method of sharing interaction information from a network service according to some embodiments of the present disclosure.

FIG. 8 shows an example method for integrating follow-up interactions posted to the network service regarding the interaction with the system 1000 and the various client applications 1010. Follow up interactions may be any comment, question, note, link, picture, audio, video, audio-video, or other media created by any individual on the network service and in response to, or relating to the externally posted interaction. Thus for example, if a question interaction is posted to FACEBOOK® any subsequent comments from any visitor to FACEBOOK® may then be integrated back into the interactive content and displayed by the client application as if it had been natively entered. Thus for example, an interaction posted to FACEBOOK® may lead to a discussion on FACEBOOK® about the interaction which may appear to users of the electronic content as if it is occurring inside the client application. The FACE-BOOK® discussion and the discussion inside the interactive electronic content displayed in the client application may be mirrored. Note that users who post follow up interactions on an external service may not necessarily be content users with access to the interactive content via client application.

In operation 7010, the interaction service may retrieve interactions created corresponding to the externally posted interaction. The interaction service may check the network service for additional interactions at a predefined interval, or may register on the network service (e.g. using API calls) to be notified upon the creation of a follow-up interaction. The interaction service may then retrieve any new follow up interactions by scraping the network service, by utilizing the API of the network service, or the like.

At operation 7020, the interactions on the network service are stored in the data store and are associated with the original interaction. At operation 7030, interactions retrieved from the network service may be delivered to one or more client applications. In some examples, the delivery is in response to a request from the client application (e.g., possibly in response to a request for interaction information for the particular content portion to which that interaction relates, or in response to a separate request), but in other examples, the delivery may be pushed to the client application.

It will be appreciated by one skilled in the art with the benefit of this disclosure that while an interaction service 1080 was used to store and transfer interactions in order to facilitate interaction sharing, that sharing of interactions could also be accomplished in a peer-to-peer manner where one client application 1010 may communicate directly with another client application in order to share interactions. Such peer-to-peer networks may be pure peer-to-peer systems, hybrid peer-to-peer systems (indexing and peer discovery are facilitated by using supernodes), or a centralized peer-to-peer system (where a central server is used for indexing functions and to bootstrap the system).

Figure 9:
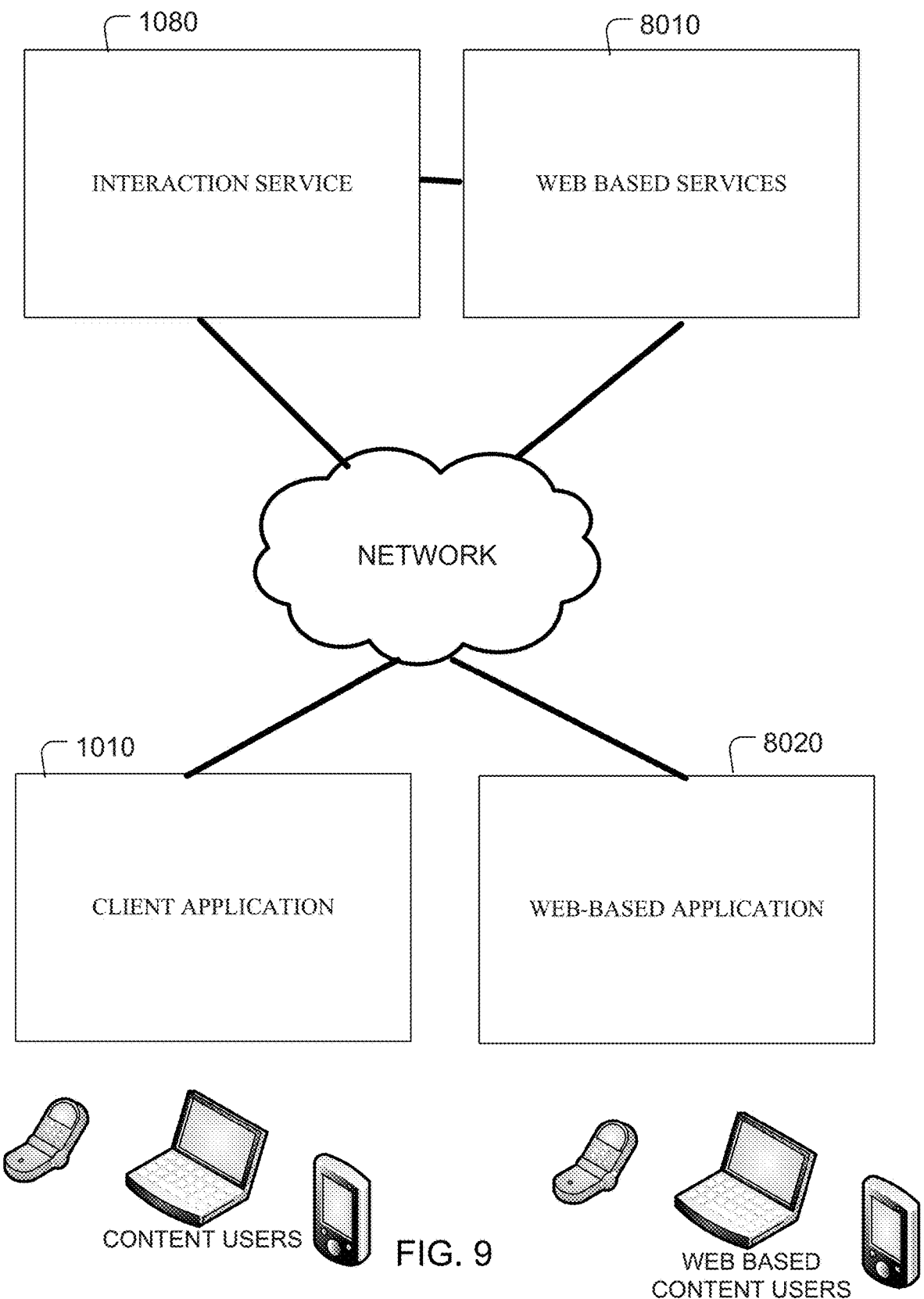
FIG. 9 shows a schematic of an object oriented interaction system according to some embodiments of the present disclosure.

Additionally, while client application 1010 may be a special software application, the functions of client application 1010 may be web based, such that the functions of client application 1010 may be implemented using an Internet browser, JavaScript, or other client side code. In some examples, some content users may execute a dedicated software application and other content users may make use of the Internet based client application. Interaction information and assessment linkage information is unaffected by the choice of a content user's method of interaction and the interactions of one client type may be visible by other client types. FIG. 9 shows one example system in which both a web based client and a dedicated application share interactions through interaction service 1080. In this example, web based application 8020 displays one or more interactive content portions, receives user input, and passes along interaction information to interaction service 1080. Web based application 8020 may comprise one or more components including a web browser, markup code (such as CSS, HTML, XML), and/or application code (e.g., JavaScript or the like). Web based services 8010 may assist web-based client application 8020 by sending one or more content portions for display in a browser of web based content users.

Despite the fact that different clients are used, the identification information about a particular content portion is still used to identify an interaction's association with one or more content portions and thus interactions entered in the web-based client 8020 may be displayed alongside the appropriate content in the client application 1010 and vice versa.

Example Use Cases

In some examples, one or more content users may share their notes, highlights, questions, discussions or the like with one or more other content users. In some examples, the user may view indications of reading presence where one content user may view where another content user is reading. In some examples, notes may turn into discussions as more people who view the notes add their own notes. In some examples, follow up interactions created by content users may generate a notification to the content user that they have a follow up interaction.

In some examples, the system may generate a notebook to display all of a content user's interactions. The notebook may pull in the interaction and the associated content portion (and maybe additional content portions for context). The notebook may be organized according to interaction, interaction type, content portion, or the like. The notebook may also pull in other user's interactions. The notebook may also summarize a content user's interactions.

In some examples, users may be presented with one or more recommended notes, highlights, questions, discussions or the like. The recommendations may be automatically generated by the system and be based upon who created the note, highlight, question, discussion or the like. For example, if a teacher or content author leaves a note, that note may be highlighted as recommended by the system. Notes created by one or more "friends" or "connections" may also be highlighted as recommended. Notes created by other individuals in the same school or institution, or who are geographically close may be recommended. Additionally, the various notes, highlights, questions, and the like may be ratable by other content users and highly rated notes, highlights, questions, and the like may be recommended based upon their rating. In yet other examples, a user who scores well on an assessment may have their notes recommended. One or more interactions (and perhaps the associated content) may be exported to a network service such as a social networking service like FACEBOOK® and the discussion may be continued there (and incorporated into the interactive content).

In some examples, each interaction may have its own sharing preferences. The interactions may be private (user only), follower based (e.g., explicit permission granted for a user, educational class, or the like), public, or the like. This may also be a global setting applied to all interactions.

In some examples, a heatmap may be displayed in the margins of the interactive content showing the most popular social interactions. Images may have interactions associated with them and the interaction may specify a point in the image. Video, audio, interactive presentations, assessments and the like may also have notes, questions, discussions, and the like associated with them.

The notes, questions, discussions, and the like may be social or shared object oriented content in the sense that it is associated with one or more content portions. This association may utilize an identifier of one or more content portions to associate the interaction with the content portion. This ensures that moving the content portion will not change the interactions, as well as ensuring that common content portions across multiple works may share interactions. The notes, questions, discussions, and the like may be shared with a network service which may facilitate sharing with other authorized users. The various interested client applications may either pull these interactions from the server or have them pushed to them by the server.

Example Target Device

Figure 10:
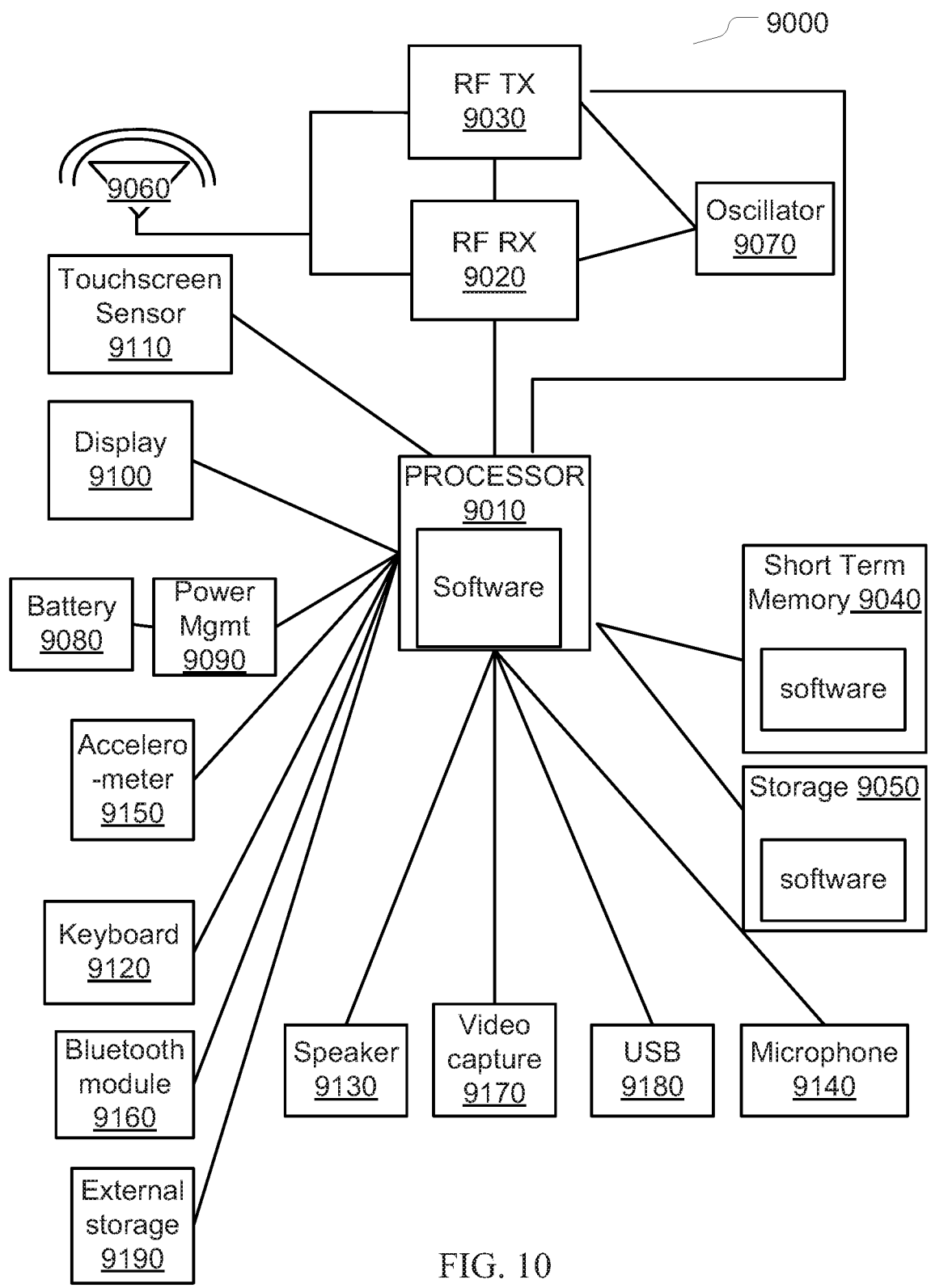
FIG. 10 shows a schematic of a computing device according to some embodiments of the present disclosure.

Client application may be executable on various computing platforms. Computing platforms may include any electronic device capable of processing the interactive electronic content and displaying it so as to properly convey the information, experiences, and idea expressions that are embodied in the electronic representation of the content in order to provide value for an end user. Examples of electronic devices include desktop computers, laptop computers, server computers, cellphones, smart phones, tablet computers, computer game consoles, portable computer gaming consoles, media players, portable media players, other mobile devices, and the like. FIG. 10 shows one example of such a device 9000 in the form of an electronic device. Processor 9010 controls the overall functions of the electronic device such as running applications and controlling peripherals. Processor 9010 may be any type of processor including RISC, CISC, VLIW, MISC, OISC, and the like. Processor 9010 may include a Digital Signal Processor ("DSP"). Processor 9010 may communicate with RF receiver 9020 and RF transmitter 9030 to transmit and receive wireless signals such as cellular, Bluetooth, and Wi-Fi signals. Processor 9010 may use short term memory 9040 to store operating instructions and help in the execution of the operating instructions such as the temporary storage of calculations and the like. Processor 9010 may also use non-transitory storage 9050 to read instructions, files, and other data that requires long term, non-volatile storage.

RF Receiver 9020 and RF Transmitter 9030 may send signals to the antenna 9060. RF transmitter 9030 contains all the necessary functionality for transmitting radio frequency signals via. antenna 9060 given a baseband signal sent from Processor 9010. RF transmitter may contain an amplifier to amplify signals before supplying the signal to antenna 9060. RF transmitter 9030 and RF Receiver 9020 are capable of transmitting and receiving radio frequency signals of any frequency including, microwave frequency bands (0.3 to 70 GHz) which include cellular telecommunications, WLAN and WWAN frequencies. Oscillator 9070 may provide a frequency pulse to both RF Receiver 8020 and RF Transmitter 9030.

Device 9000 may include a battery or other power source 9080 with associated power management process or module 9090. Power management module 9090 distributes power from the battery 9080 to the other various components. Power management module 9090 may also convert the power from battery 9080 to match the needs of the various components. Power may also be derived from alternating or direct current supplied from a power network.

Processor 9010 may communicate and control other peripherals, such as LCD display 9100 with associated touch screen sensor 9110. Processor 9010 causes images to be displayed on LCD display 9100 and receives input from the touch screen sensor 9110 when a user presses on the touch-screen display. In some examples touch screen sensor 9110 may be a multi-touch sensor capable of distinguishing, and processing gestures.

Processor 9010 may receive input from a physical keyboard 9120. Processor 9010 may produce audio output, and other alerts which are played on the speaker 9130. Speaker 9130 may also be used to play voices (in the case of a voice phone call) that have been received from RF receiver 9020 and been decoded by Processor 9010. Microphone 9140 may be used to transmit a voice for a voice call conversation to Processor 9010 for subsequent encoding and transmission using RF Transmitter 9030. Microphone 9140 may also be used as an input device for commands using voice processing software. Accelerometer 9150 provides input on the motion of the device 9000 to processor 9010. Accelerometer 9150 may be used in motion sensitive applications. Bluetooth module 9160 may be used to communicate with Bluetooth enabled external devices. Video capture device 9170 may be a still or moving picture image capture device or both. Video Capture device 9170 is controlled by Processor 9010 and may take and store photos, videos, and may be used in conjunction with microphone 9140 to capture audio along with video. USB port 9180 enables external connections to other devices supporting the USB standard and charging capabilities. USB port 9180 may include all the functionality to connect to, and establish a connection with an external device over USB. External storage module 9190 may include any form of removable physical storage media such as a flash drive, micro SD card, SD card, Memory Stick and the like. External storage module 9190 may include all the functionality needed to interface with these media.

Modules, Components and Logic

Certain embodiments are described herein as including logic or a number of components, modules, or mechanisms. Modules or components may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Implementation

Figure 11:
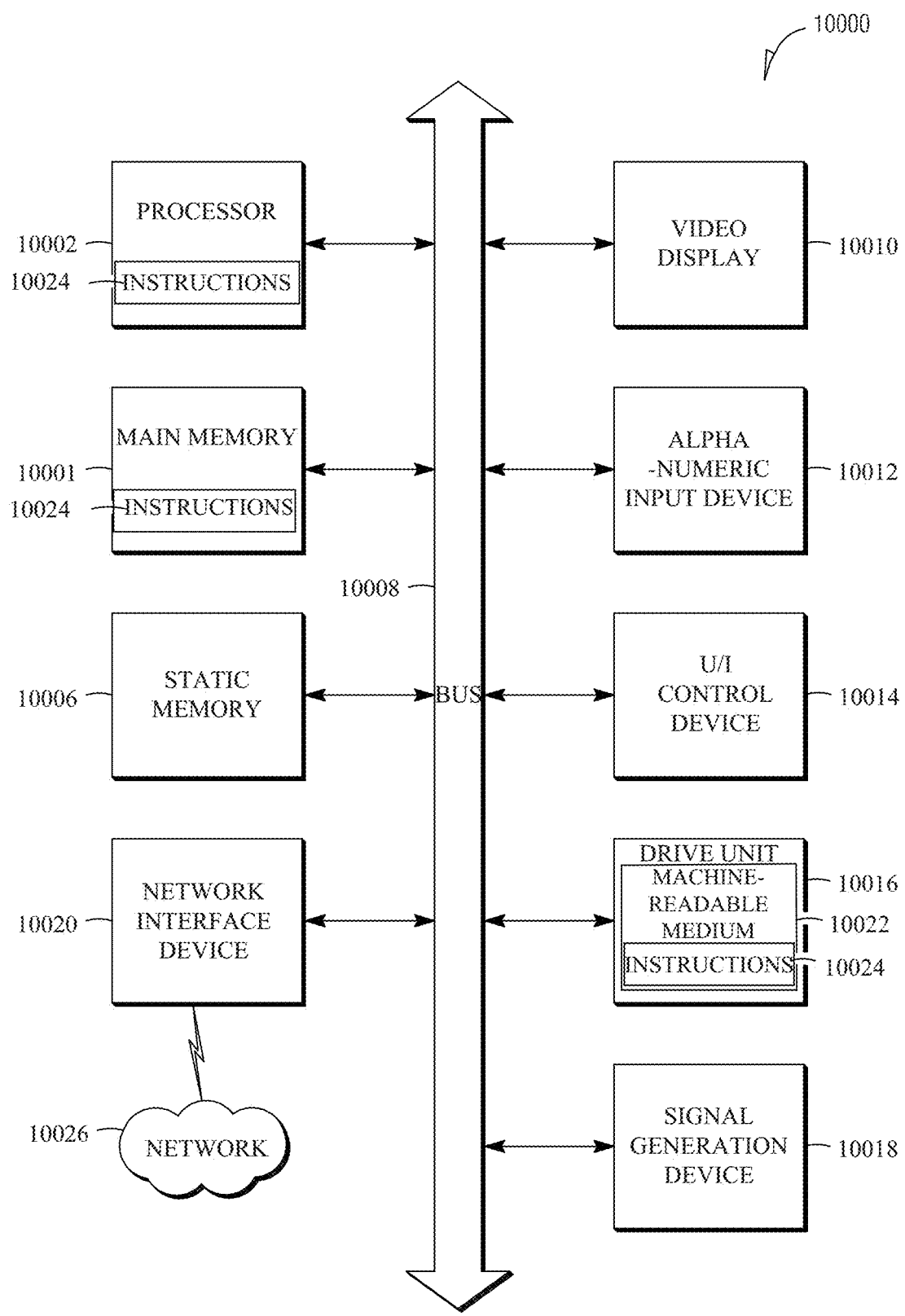
FIG. 11 shows a schematic of a machine according to some embodiments of the present disclosure.

FIG. 11 shows a diagrammatic representation of a machine in the example form of a computer system 10000 within which a set of instructions for causing the machine to perform any one or more of the methods, processes, operations, or methodologies discussed herein may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer (PC), a tablet PC, a Set-Top Box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments may also be practiced in distributed system environments where local and remote computer systems which that are linked (e.g., either by hardwired, wireless, or a combination of hardwired and wireless connections) through a network, both perform tasks. In a distributed system environment, program modules may be located in both local and remote memory-storage devices (see below).

The example computer system 10000 includes a processor 10002 (e.g., a Central Processing Unit (CPU), a Graphics Processing Unit (GPU) or both), a main memory 10001 and a static memory 10006, which communicate with each other via a bus 10008. The computer system 10000 may further include a video display unit 10010 (e.g., a Liquid Crystal Display (LCD) or a Cathode Ray Tube (CRT)). The computer system 10000 also includes an alphanumeric input device 10012 (e.g., a keyboard), a User Interface (UI) controller 10014 (e.g., a mouse), a disk drive unit 10016, a signal generation device 10018 (e.g., a speaker) and a network interface device 10020 (e.g., a transmitter).

The disk drive unit 10016 includes a machine-readable medium 10022 on which is stored one or more sets of instructions 10024 and data structures (e.g., software) embodying or used by any one or more of the methodologies or functions illustrated herein. The software may also reside, completely or at least partially, within the main memory 10001 and/or within the processor 10002 during execution thereof by the computer system 10000, the main memory 10001 and the processor 10002 also constituting machine-readable media.

The instructions 10024 may further be transmitted or received over a network 10026 via the network interface device 10020 using any one of a number of well-known transfer protocols (e.g., HTTP, Session Initiation Protocol (SIP)).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any of the one or more of the methodologies illustrated herein. The term "machine-readable medium" shall accordingly be taken to include, but not be limited to, solid-state memories, and optical and magnetic medium.

Method embodiments illustrated herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, Random Access Memories (RAMs), Read Only Memories (ROMs), and the like.

Other Notes and Examples

Disclosed in one example is a method of social interaction including receiving interaction information for an interaction created by a first user of an electronic content work, the interaction information comprising an identification number of a portion of the electronic content work associated with the interaction, storing the received interaction information, receiving a request for interaction information associated with a portion of the electronic content work identified in the request from a second user, and sending the received interaction information if the identification number associated with the received interaction information matches the identification in the request for interaction information.

Disclosed in another example is a social interaction system including an input module configured to receive interaction information for an interaction created by a first user of an electronic content work, the interaction information comprising an identification number of a portion of the electronic content work associated with the interaction. In some examples, the system further includes a storage module configured to store the received interaction information. In yet other examples the system includes a request module configured to receive a request for interaction information associated with a portion of the electronic content work identified in the request from a second user. Finally, in yet other examples, the system includes an output module configured to send the received interaction information if the identification number associated with the received interaction information matches the identification in the request for interaction information.

Disclosed in some examples is a machine-readable medium comprising instructions which when executed by the machine cause the machine to perform certain operations. In some examples the operations may include receiving interaction information for an interaction created by a first user of an electronic content work, the interaction information comprising an identification number of a portion of the electronic content work associated with the interaction, storing the received interaction information, receiving a request for interaction information associated with a portion of the electronic content work identified in the request from a second user, and sending the received interaction information if the identification number associated with the received interaction information matches the identification in the request for interaction information.

Additional Notes

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

Thus, the following claims are hereby incorporated into the Detailed Description, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. A method of disseminating content creator interactions with one or more content portions of a first instance of an electronic content work viewed in a first client application to other instances of the electronic content work viewed in other respective client applications, the method comprising:
   receiving, at an interaction service system communicatively coupled to the first client application, a plurality of content creator interface actions modifying the one or more content portions of the first instance of the electronic content work;
   creating a plurality of content creator interactions by generating a content creator interaction based on each respective content creator interface action, wherein each content creator interaction is associated with an identifier for a respective content portion of the one or more content portions, an interaction type, and interaction contents;
   determining one or more recommended interactions by identifying interactions associated with an individual who has scored above a threshold on an assessment testing the individual's knowledge of the one or more content portions; and
   sending the one or more recommended interactions for concurrent presentation with the associated content portions of the other instances of the electronic content work to respective viewing client user interfaces of the other respective client applications.

2. The method of claim 1, wherein the content creator interactions include supplementary material, content updates, or clarifications for the electronic content work.

3. The method of claim 1, wherein the interaction contents comprise text, graphics, audio, or visual content provided via the respective content creator interface action.

4. The method of claim 1, wherein the presentation of the one or more recommended interactions includes an indication of a popularity of the one or more recommended interactions.

* * * * *